(12) United States Patent
Masuda et al.

(10) Patent No.: US 11,961,676 B2
(45) Date of Patent: Apr. 16, 2024

(54) ELECTRONIC DEVICE

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Kosuke Yazawa, Tokyo (JP); Yoshiki Satou, Tokyo (JP); Katsumi Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 170 days.

(21) Appl. No.: 17/847,717

(22) Filed: Jun. 23, 2022

(65) Prior Publication Data

US 2023/0010668 A1  Jan. 12, 2023

(30) Foreign Application Priority Data

Jul. 9, 2021 (JP) .................. 2021-114539

(51) Int. Cl.
*H01G 4/224* (2006.01)
*H01G 4/30* (2006.01)

(52) U.S. Cl.
CPC .............. *H01G 4/224* (2013.01); *H01G 4/30* (2013.01)

(58) Field of Classification Search
CPC .................................................. H01G 4/224
See application file for complete search history.

(56) References Cited

U.S. PATENT DOCUMENTS

| 2020/0098521 | A1* | 3/2020 | Ito ........................... H01G 4/38 |
| 2021/0043382 | A1* | 2/2021 | Masuda ................... H01G 2/10 |
| 2021/0351527 | A1* | 11/2021 | Gondo ................. H01R 13/502 |
| 2023/0142563 | A1* | 5/2023 | Hashimoto ............ H01G 2/103 |
| | | | 361/500 |

FOREIGN PATENT DOCUMENTS

JP        2020-107872 A       7/2020

* cited by examiner

*Primary Examiner* — Hung V Ngo
(74) *Attorney, Agent, or Firm* — Oliff PLC

(57) ABSTRACT

An electronic device 10 comprises chip capacitors 20a and 20b, an accommodation recess 62 accommodating the chip capacitors 20a and 20b, and a case 60 including a protrusion 64 partitioning the accommodation recess 62 into a first accommodation space 62a and a second accommodation space 62b along the X-axis direction. The protrusion 64 includes a first protrusion 64a and a second protrusion 64b disposed away from the first protrusion 64a along the Y-axis direction. The first protrusion 64a and the second protrusion 64b are disposed with a communication space 69 provided between the first protrusion 64a and the second protrusion 64b, so that the first accommodation space 62a and the second accommodation space 62b communicate.

10 Claims, 16 Drawing Sheets

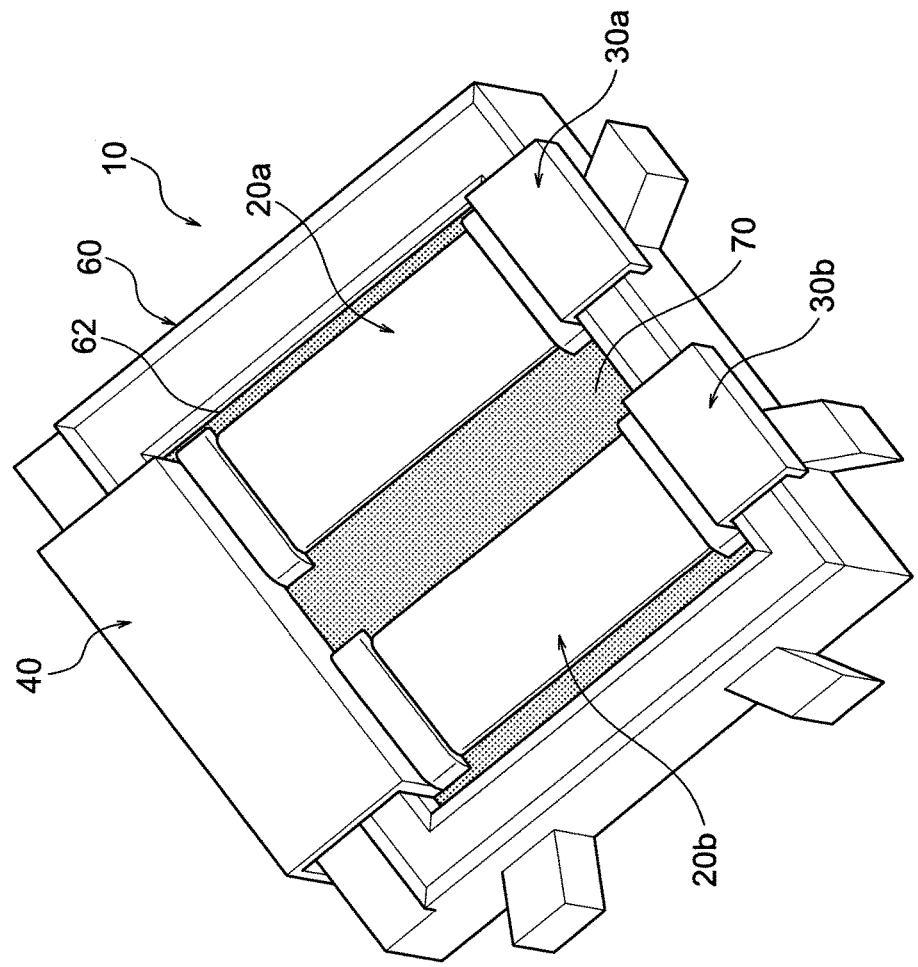
FIG. 1
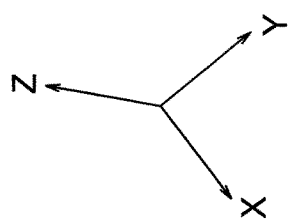

ELECTRONIC DEVICE

TECHNICAL FIELD

The present invention relates to an electronic device including a case that can accommodate a chip component.

BACKGROUND

An electronic device described in Patent Literature 1 is an example of an electronic device including a case that can accommodate a chip component. The case of the electronic device described in Patent Literature 1 includes an accommodation recess for accommodating a chip component. The accommodation recess is partitioned into accommodation spaces with a partition wall. By accommodating a plurality of chip components in the accommodation spaces, the chip components can be favorably insulated from one another.

For such an electronic device, a treatment for filling the accommodation recess with a sealing resin is carried out when the chip components are accommodated in the accommodation recess. For example, an injection instrument (e.g., a dispenser) is used for filling the accommodation recess with the resin. By inserting the injection instrument between the chip components and the partition wall and injecting the resin from the clearance between the chip components and the partition wall, the accommodation recess can be filled with the resin.

Unfortunately, when the chip components are accommodated in the accommodation recess, a flow of the resin is prevented by the partition wall or the like. This not only requires time for filling the accommodation recess with the resin but also readily causes an overflow of the resin from the accommodation recess and makes it difficult for the accommodation recess to be evenly filled with the resin. Improvement is thus demanded.

Patent Literature 1: JP Patent Application Laid Open No. 2020-107872

BRIEF SUMMARY OF THE INVENTION

The present invention has been achieved under such circumstances. It is an object of the invention to provide an electronic device including a case capable of being filled with a resin easily.

To achieve the above object, an electronic device according to the present invention comprises
  a chip component;
  an accommodation recess accommodating the chip component; and
  a case including a protrusion partitioning the accommodation recess into a first accommodation space and a second accommodation space along a first axis direction; wherein
  the protrusion includes a first protrusion and a second protrusion disposed away from the first protrusion along a second axis direction orthogonal to the first axis direction; and
  the first protrusion and the second protrusion are disposed with a communication space provided between the first protrusion and the second protrusion, so that the first accommodation space and the second accommodation space communicate.

In the electronic device according to the present invention, the protrusion includes the first protrusion and the second protrusion disposed away from the first protrusion along the second axis direction orthogonal to the first axis direction, and the first protrusion and the second protrusion are disposed with a communication space provided between the first protrusion and the second protrusion, so that the first accommodation space and the second accommodation space communicate. Forming the communication space between the first protrusion and the second protrusion enables the communication space to be used as a space for installing an injection instrument or a passage through which the resin flows when the resin fills the accommodation recess. That is, by installing the injection instrument between the first protrusion and the second protrusion (the communication space) and injecting the resin, the accommodation recess can be filled with the resin injected through the communication space. Consequently, the accommodation recess can be filled with a sufficient amount of the resin in a short amount of time without the flow of the resin being prevented by the protrusion, and an overflow of the resin from the accommodation recess can be prevented.

The resin injected into the communication space with the injection instrument diverges and flows from the communication space toward the first accommodation space and the second accommodation space. Both the first accommodation space and the second accommodation space can thus be filled with the resin by performing a treatment for filling the accommodation recess with the resin once. Because the first accommodation space and the second accommodation space do not need to be separately filled with the resin, productivity can be improved. Also, because a substantially constant amount of the resin flows in the first accommodation space and the second accommodation space from the communication space, a substantially equal amount of the resin can fill the first accommodation space and the second accommodation space.

Preferably, the accommodation recess is filled with the resin, and the communication space is filled with the resin. Filling the accommodation recess with the resin to resin-seal chip components accommodated in the accommodation recess enables achievement of the electronic device having excellent moisture resistance, vibration resistance, dust resistance, heat dissipation ability, and the like. By filling the communication space with the resin, the first protrusion and the second protrusion are connected via the hardened resin, and the first accommodation space and the second accommodation space separate from each other in the first axis direction by the protrusion and the resin. Consequently, when the first accommodation space and the second accommodation space accommodate the chip components, the chip component disposed in the first accommodation space and the chip component disposed in the second accommodation space can be favorably insulated from one another.

Preferably, a length of the communication space along the second axis direction is equivalent to or greater than a thickness of the protrusion along the first axis direction. With this structure, the communication space providing enough space for installing the injection instrument can be formed between the first protrusion and the second protrusion. Consequently, the injection instrument is readily installed in the communication space, and a treatment for filling the accommodation recess with the resin is readily carried out.

Preferably, the first protrusion and the second protrusion are separated from each other along the second axis direction and stand on a bottom surface of the accommodation recess. With this structure, the communication space extending toward the bottom surface of the accommodation recess is formed between the first protrusion and the second protrusion. Through the communication space, the injection instrument can be inserted to reach the vicinity of the bottom surface of the accommodation recess. As the resin is injected in the communication space from the vicinity of the bottom surface of the accommodation recess, the resin fills the accommodation recess due to pressure applied at the time of injection, gradually from the bottom surface to the opening of the accommodation recess. The overflow of the resin from the accommodation recess can thus be effectively prevented. Also, time necessary for filling the accommodation recess with the resin can be effectively reduced, and the first accommodation space and the second accommodation space can each be filled with an effectively equalized amount of the resin.

Preferably, at least one of the first protrusion or the second protrusion is connected to an inner wall surface of the accommodation recess, a communication groove is formed where the at least one of the first protrusion or the second protrusion is connected to the inner wall surface of the accommodation recess, and the communication groove is recessed toward the bottom surface of the accommodation recess and enables the first accommodation space and the second accommodation space to communicate. For example, by inserting a conductive terminal in the communication groove and connecting a terminal electrode of the chip component accommodated in the first accommodation space and a terminal electrode of the chip component accommodated in the second accommodation space via the conductive terminal, these chip components can be electrically connected inside the case.

Preferably, a bottom surface groove is formed on the bottom surface of the accommodation recess, and the bottom surface groove extends between the first protrusion and the second protrusion toward an outer edge of the bottom surface of the accommodation recess. With this structure, the resin injected into the communication space with the injection instrument flows inside the bottom surface groove toward the outer edge of the bottom surface of the accommodation recess. The resin can thus spread toward the outer edge of the bottom surface of the accommodation recess effectively.

Preferably, the bottom surface groove includes a first bottom surface groove extending along the first axis direction between the first protrusion and the second protrusion and a second bottom surface groove extending along the second axis direction so that the second bottom surface groove is connected to the first bottom surface groove. With this structure, the resin injected into the communication space with the injection instrument flows inside the first bottom surface groove along the first axis direction toward the outer edge of the bottom surface of the accommodation recess, diverges from the first bottom surface groove, and flows inside the second bottom surface groove along the second axis direction. Consequently, the resin can spread toward the outer edge of the bottom surface of the accommodation recess in the first and second axis directions effectively.

Preferably, a pair of joint protrusions protruding outwards from a side surface of the case and a joint recess recessed inwards from another side surface of the case are formed on the side surfaces of the case. With this structure, when the electronic device includes a plurality of cases (e.g., two cases), the joint protrusions of one case can engage with the joint recess of the other case, which enables the cases to be connected.

BRIEF DESCRIPTION OF THE DRAWING(S)

FIG. 1 is a perspective view of an electronic device according to a first embodiment of the present invention.

DETAILED DESCRIPTION OF THE INVENTION

Figure 2:
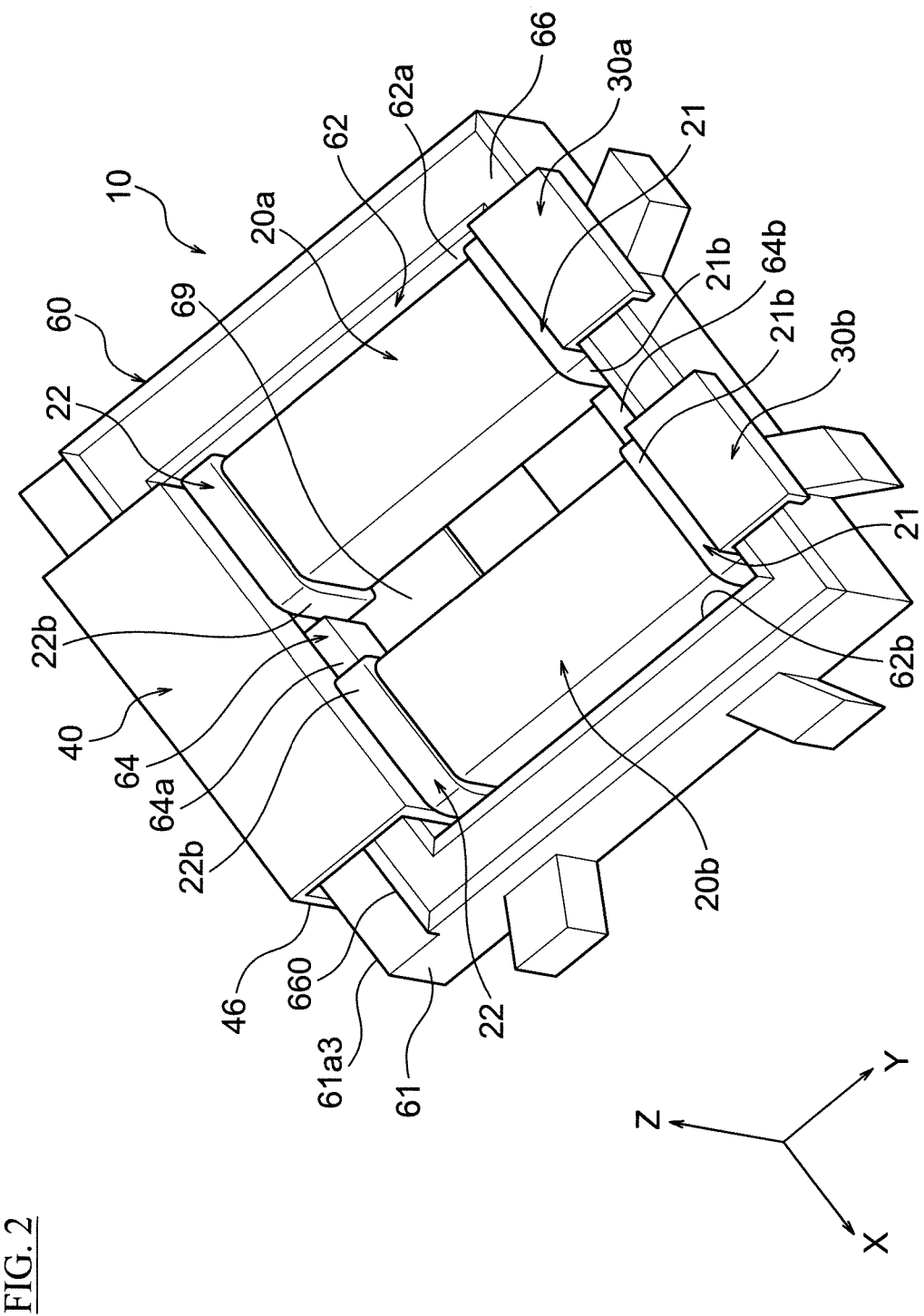
FIG. 2 is a perspective view illustrating a state of the inside of the case of the electronic device shown in FIG. 1.

Hereinafter, the present invention is described based on the embodiments shown in the figures.

First Embodiment

As shown in FIG. 1, an electronic device 10 according to a first embodiment of the present invention includes two chip capacitors (chip components) 20a and 20b and a case 60. The case 60 has conductive terminals attached. In the present embodiment, a first individual metal terminal 30a, a second individual metal terminal 30b, and a common metal terminal 40 are attached as the conductive terminals. The inside of the case 60 is filled with a sealing resin 70, with which the two chip capacitors 20a and 20b can be resin-sealed.

Figure 3:
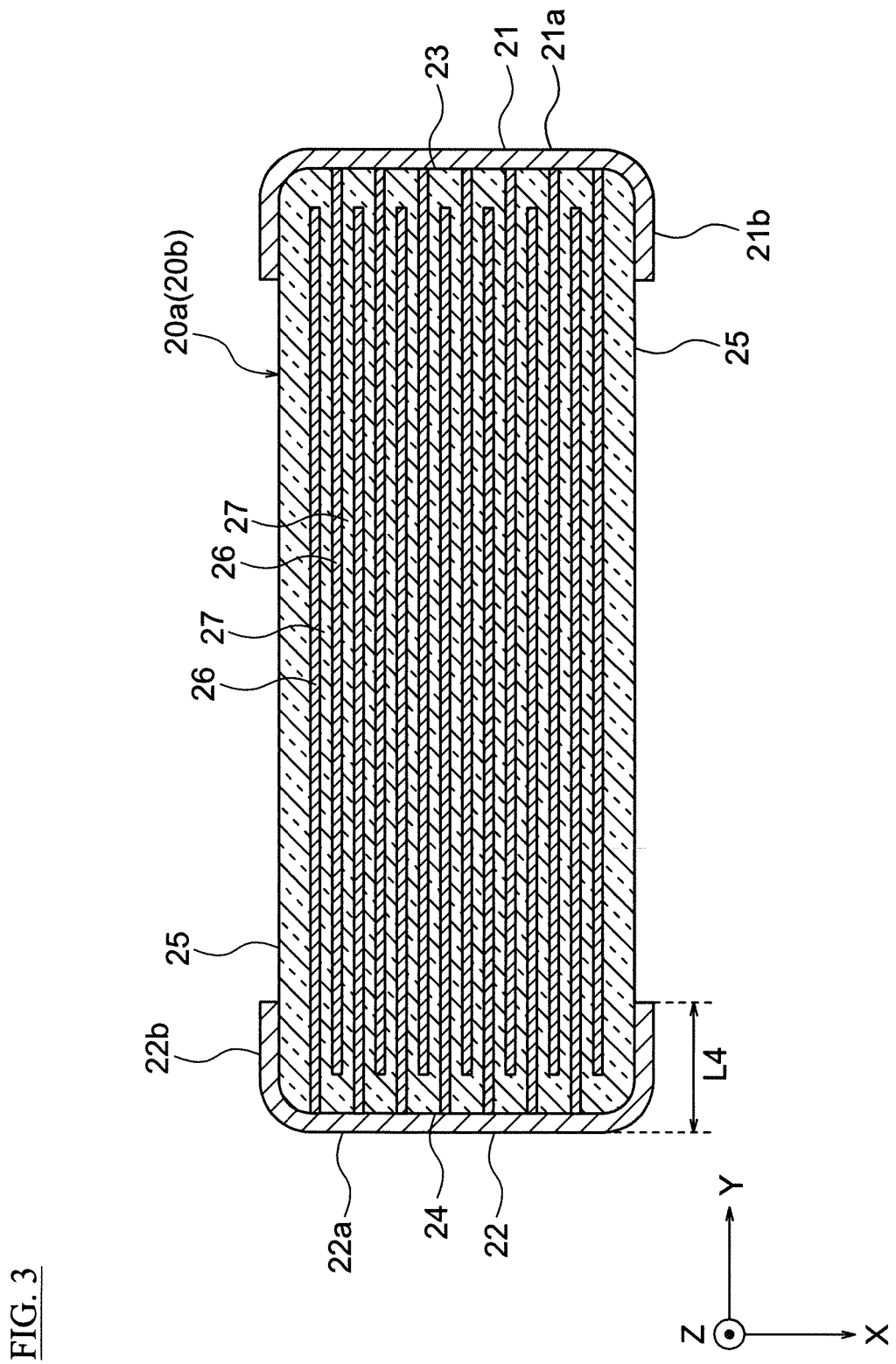
FIG. 3 is a cross-sectional view of a chip component shown in FIG. 1 cut in parallel to the XY plane.

As shown in FIG. 2, the chip capacitors 20a and 20b each have a substantially rectangular parallelepiped shape and have substantially the same shape and size. As shown in FIG. 3, the chip capacitor 20a (20b) has an element body in which internal electrode layers 26 and dielectric layers 27 are laminated along the X-axis direction. On a first end surface 23 and a second end surface 24 of the element body facing each other in the Y-axis direction (longitudinal direction), a first terminal electrode 21 and a second terminal electrode 22 are formed respectively.

The first terminal electrode 21 includes a first end surface electrode portion 21a and a first side surface electrode portion 21b. The first end surface electrode portion 21a is formed on the first end surface 23 of the chip capacitor 20a (20b) and is connected to the internal electrode layers 26 at their ends exposed on the first end surface 23 in the positive direction of the Y-axis. The first side surface electrode portion 21b is formed so as to extend from the first end surface 23 of the chip capacitor 20a (20b) round to an end of a side surface 25 of the chip capacitor 20a (20b) in the positive direction of the Y-axis.

The second terminal electrode 22 includes a second end surface electrode portion 22a and a second side surface electrode portion 22b. The second end surface electrode portion 22a is formed on the second end surface 24 of the chip capacitor 20a (20b) and is connected to the internal electrode layers 26 at their ends exposed on the second end surface 24 in the negative direction of the Y-axis. The second side surface electrode portion 22b is formed so as to extend from the second end surface 24 of the chip capacitor 20a (20b) round to an end of the side surface 25 of the chip capacitor 20a (20b) in the negative direction of the Y-axis.

The dielectric layers 27 of the chip capacitors 20a and 20b may be made of any material and are made of, for example, dielectric materials, such as calcium titanate, strontium titanate, barium titanate, and a mixture of these. The thickness of each dielectric layer 27 is not limited and is typically 1 μm to several hundred μm. In the present embodiment, each dielectric layer 27 has a thickness of preferably 1.0 to 5.0 μm.

The internal electrode layers 26 may include any conductive material. The conductive material can be a relatively inexpensive base metal when the material of the dielectric layers 27 has resistance to reduction. The base metal is preferably Ni or a Ni alloy. The internal electrode layers 26 can also be formed with a commercially available electrode paste. The thickness of each internal electrode layer 26 may be appropriately determined based on a purpose or so.

The first terminal electrode 21 and the second terminal electrode 22 may also be made of any material and are normally made of copper, a copper alloy, nickel, a nickel alloy, or the like. Silver, a silver-palladium alloy, or the like can also be used. The thickness of the first terminal electrode 21 and the thickness of the second terminal electrode 22 are not limited and are normally about 10 μm to about 50 μm. A metal film composed of at least one selected from Ni, Cu, Sn, etc. may be formed on a surface of the first terminal electrode 21 and a surface of the second terminal electrode 22. For example, a metal film including a fired layer containing Cu as a main component, a Ni plating layer formed on the fired layer, and a Sn plating layer formed on the Ni plating layer may be formed.

The shape and size of the chip capacitors 20a and 20b may be appropriately determined based on a purpose, usage, or the like. For example, the chip capacitors 20a and 20b have a length of about 1.0 to 6.5 mm (dimension in the Y-axis direction in FIG. 2), a width of about 0.5 to 5.5 mm (dimension in the X-axis direction in FIG. 2), and a height of about 0.3 to 3.5 mm (dimension in the Z-axis direction in FIG. 2). The chip capacitors 20a and 20b may have different sizes and shapes.

Figure 4A:
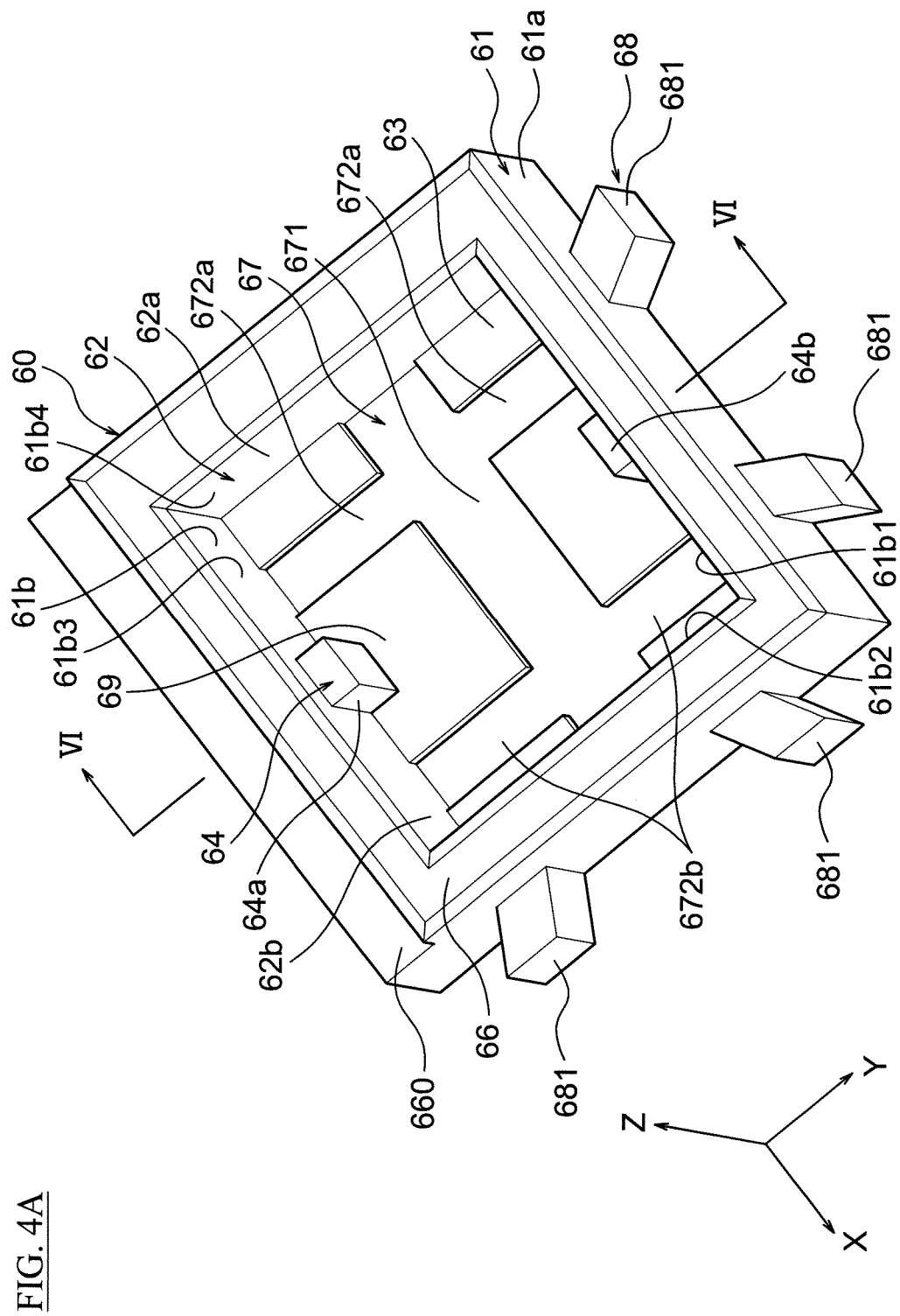
FIG. 4A is a perspective view illustrating a state of the inside of the case shown in FIG. 1.

As shown in FIG. 4A, the case 60 is formed so that it can accommodate the chip capacitors 20a and 20b and includes an outer wall 61, an accommodation recess 62, a bottom wall 63, a protrusion 64, an opening edge surface 66, a bottom surface groove 67, and a joint portion 68. The case 60 is made of an insulator, such as ceramics, glass, or a synthetic resin. The outer wall 61 includes an outer surface 61a and an inner wall surface 61b each having a substantially rectangular shape, and surrounds the accommodation recess 62 together with the bottom wall 63.

The accommodation recess 62 includes a recess that can accommodate the two chip capacitors 20a and 20b. The opening of the recess faces the Z-axis direction (upwards). The accommodation recess 62 can accommodate the chip capacitors 20a and 20b disposed side by side in the X-axis direction (see FIG. 2). That is, the chip capacitors 20a and 20b accommodated in the accommodation recess 62 are arranged along a direction (the X-axis direction) orthogonal to the longitudinal direction (the Y-axis direction) of each chip capacitor. The chip capacitors 20a and 20b can be effectively protected from impact or so by being accommodated inside the accommodation recess 62. As shown in FIG. 3, the longitudinal direction of the chip capacitor 20a (20b) corresponds to a direction in which the first terminal electrode 21 (the first end surface electrode portion 21a) and the second terminal electrode 22 (the second end surface electrode portion 22a) are facing each other.

As shown in FIG. 4A, the accommodation recess 62 can be partitioned into a first accommodation space 62a and a second accommodation space 62b with the protrusion 64 physically or conceptually. Details of the protrusion 64 are described later. In the accommodation recess 62, the first accommodation space 62a is a space formed in the negative direction of the X-axis from the protrusion 64, and the second accommodation space 62b is a space formed in the positive direction of the X-axis from the protrusion 64. With the protrusion 64 provided in between, the first accommodation space 62a and the second accommodation space 62b are formed side by side in the X-axis direction. The first accommodation space 62a and the second accommodation space 62b are not completely separated by the protrusion 64 and communicate via a communication space 69. Details of the communication space 69 are described later.

The first accommodation space 62a can accommodate the chip capacitor 20a, and the second accommodation space 62b can accommodate the chip capacitor 20b. The length of the first accommodation space 62a along the Y-axis direction corresponds to the length of the chip capacitor 20a in its lengthwise direction (the Y-axis direction or the longitudinal direction), and the length of the first accommodation space 62a along the X-axis direction corresponds to the length of the chip capacitor 20a in its widthwise direction (the X-axis direction or the short direction). The length of the second accommodation space 62b along the Y-axis direction corresponds to the length of the chip capacitor 20b in its lengthwise direction, and the length of the second accommodation space 62b along the X-axis direction corresponds to the length of the chip capacitor 20b in its widthwise direction.

The accommodation recess 62 has a depth deeper than the thickness or the height of the chip capacitors 20a and 20b. Consequently, the respective side surfaces 25 of the chip capacitors 20a and 20b do not protrude from the opening (the opening edge surface 66) of the accommodation recess 62 when the chip capacitors 20a and 20b are accommodated in the accommodation recess 62.

As shown in FIG. 2, in the accommodation recess 62, the chip capacitor 20a accommodated in the first accommodation space 62a and the chip capacitor 20b accommodated in the second accommodation space 62b are disposed with a predetermined distance in between in the X-axis direction. The distance corresponds to the thickness of the protrusion 64 in the X-axis direction or the length (breadth) of the communication space 69 in the X-axis direction.

As shown in FIG. 1, the accommodation recess 62 can be filled with the resin 70 when accommodating the two chip capacitors 20a and 20b. The resin 70 fills the accommodation recess 62 so that its height is approximately as high as the side surfaces (top surfaces) of the chip capacitors 20a and 20b accommodated in the accommodation recess 62. However, the amount of the resin 70 may be larger or smaller. Filling the accommodation recess 62 with the resin 70 to resin-seal the chip capacitors 20a and 20b accommodated in the accommodation recess 62 enables achievement of the electronic device 10 having excellent moisture resistance, vibration resistance, impact resistance, dust resistance, heat dissipation ability, and the like. A thermosetting resin, such as an epoxy-based resin or a phenol-based resin, can be used as the resin 70.

As shown in FIG. 4A, the bottom wall 63 has a substantially square shape, seen from the Z-axis direction, and forms a bottom surface of the accommodation recess 62. On the bottom wall 63, the chip capacitors 20a and 20b are installed. On the top surface of the bottom wall 63 (the bottom surface of the accommodation recess 62), the protrusion 64 and the bottom surface groove 67 are formed. Their detailed structure is described later.

The opening edge surface 66 is formed along the opening of the accommodation recess 62, on the top surface of the outer wall 61. The opening edge surface 66 is formed on the top surface of the outer wall 61 circumferentially in a substantially ring shape. A corner where the opening edge surface 66 and the outer surface 61a of the outer wall 61 meet is tapered. Similarly, a corner where the opening edge surface 66 and the inner wall surface 61b of the outer wall 61 meet is tapered. As shown in FIG. 2, the first individual metal terminal 30a, the second individual metal terminal 30b, and the common metal terminal 40 can be fixed on the opening edge surface 66. These conductive terminals are attached to the case 60 so that they bridge the opening edge surface 66 in the Y-axis direction.

As shown in FIG. 4A, a step portion 660 is formed at a part of the opening edge surface 66 in the negative direction of the Y-axis. The step portion 660 extends from one end to the other end of the case 60 in the X-axis direction and has a predetermined width in the Y-axis direction. For example, the step portion 660 may be used to fix (engage) the common metal terminal 40 (see FIG. 2). Although a portion (a side electrode portion 46) of the common metal terminal 40 is fixed to the outer surface 61a (a third surface 61a3) of the outer wall 61 in the example shown in FIG. 2, the portion may be fixed to or engage with a vertical surface (a surface parallel to the YZ plane) of the step portion 660.

Figure 5A:
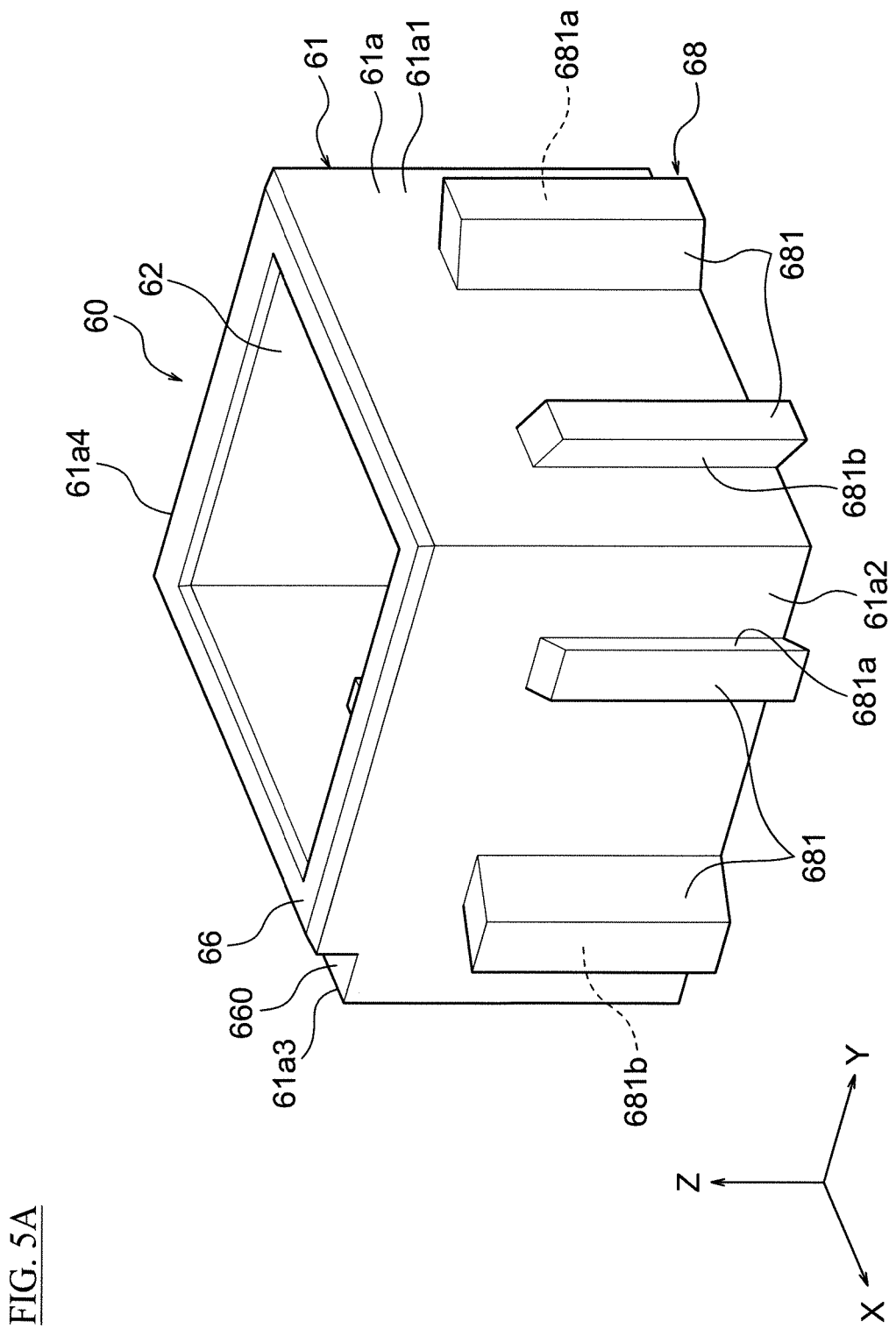
FIG. 5A is a perspective view of the case shown in FIG. 4A.
Figure 5B:
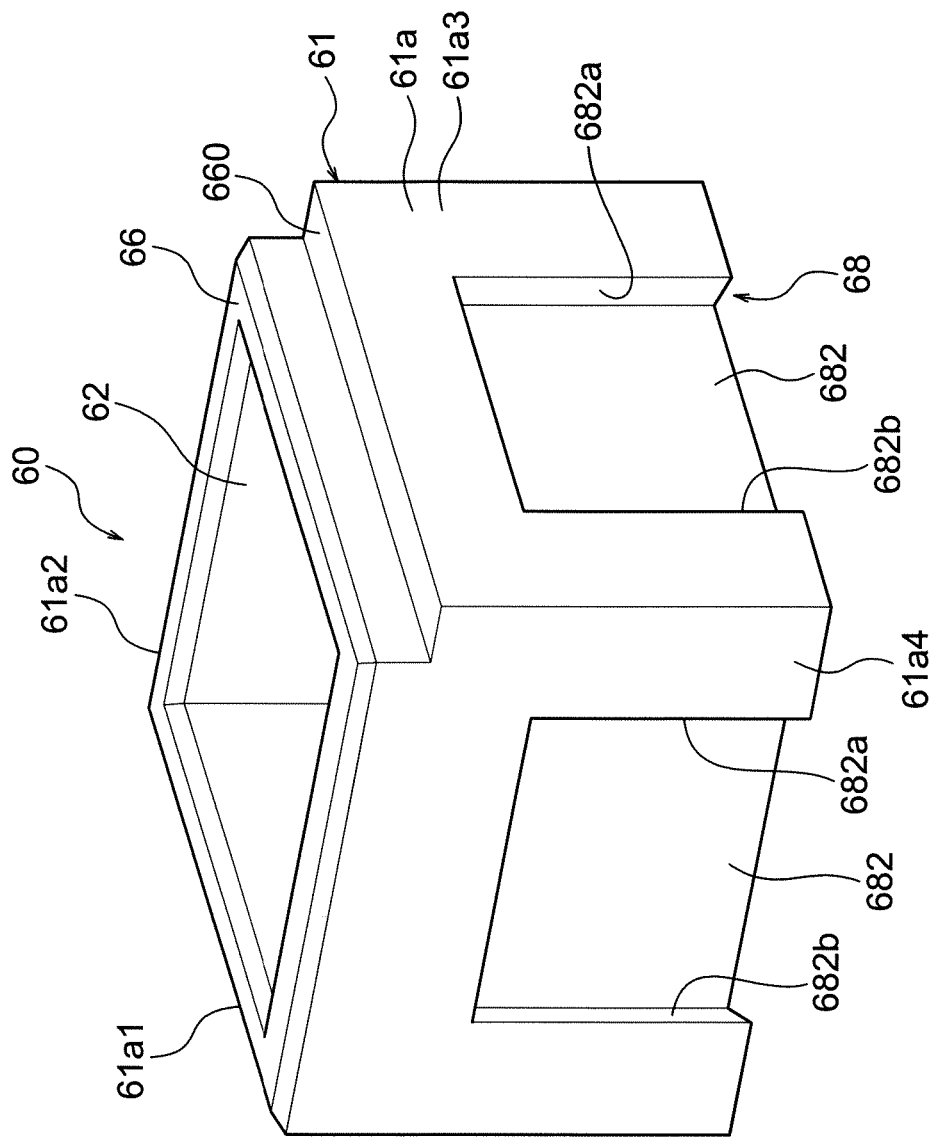
FIG. 5B is a perspective view of the case shown in FIG. 5A when rotated around the Z-axis (rotation axis) by 180 degrees.

As shown in FIG. 4A, the joint portion 68 is formed on the outer surface 61a of the outer wall 61. As shown in FIGS. 5A and 5B, the outer surface 61a includes a first surface 61a1 located in the positive direction of the Y-axis, a second surface 61a2 next to the first surface 61a1 in the clockwise direction, the third surface 61a3 next to the second surface 61a2 in the clockwise direction, and a fourth surface 61a4 next to the third surface 61a3 in the clockwise direction. The joint portion 68 includes a pair of joint protrusions 681 and a joint recess 682. The pair of joint protrusions 681 is formed on the first surface 61a1 and the second surface 61a2. The joint recess 682 is formed on the third surface 61a3 and the fourth surface 61a4.

As shown in FIG. 5A, the pair of joint protrusions 681 formed on the first surface 61a1 is disposed with a predetermined distance in between in the X-axis direction and extends along the Z-axis direction in a substantially parallel manner. Each of the pair of joint protrusions 681 has a columnar structure with a predetermined length in the Z-axis direction. More specifically, each of the pair of joint protrusions 681 has a substantially rectangular parallelepiped shape whose longitudinal direction corresponds with the Z-axis direction, and a horizontal cross section (a cross section parallel to the XY plane) of each of the pair of joint protrusions 681 has a quadrilateral shape (more specifically, a parallelogram shape). Each of the pair of joint protrusions 681 extends from the bottom edge of the first surface 61a1 to the near center of the first surface 61a1 continuously along the Z-axis direction. Each of the pair of joint protrusions 681 may extend from the bottom edge of the first surface 61a1 to the near center of the first surface 61a1 intermittently along the Z-axis direction.

Each of the pair of joint protrusions 681 protrudes from the first surface 61a1 outwards in the Y-axis direction. One joint protrusion 681 protrudes outwards in the Y-axis direction while tilting toward the negative direction of the X-axis, and the other joint protrusion 681 protrudes outwards in the Y-axis direction while tilting toward the positive direction of the X-axis. That is, the pair of joint protrusions 681 protrudes outwards in the Y-axis direction while tilting away from each other in the X-axis direction, and the distance between the pair of joint protrusions 681 along the X-axis direction increases as the distance from the first surface 61a1 in the Y-axis direction increases.

An outer surface 681a on the negative direction of the X-axis of one joint protrusion 681 is angled. Similarly, an outer surface 681b on the positive direction of the X-axis of the other joint protrusion 681 is angled. The outer surfaces 681a and 681b extend outwards in the Y-axis direction while tilting away from each other in the X-axis direction, and the distance between the outer surfaces 681a and 681b along the X-axis direction increases as the distance from the first surface 61a1 in the Y-axis direction increases.

A pair of joint protrusions 681 formed on the second surface 61a2 is disposed with a predetermined distance in between in the Y-axis direction and extends along the Z-axis direction in a substantially parallel manner. The pair of joint protrusions 681 formed on the second surface 61a2 has a shape similar to that of the pair of joint protrusions 681 formed on the first surface 61a1. Each of the pair of joint protrusions 681 formed on the second surface 61a2 extends from the bottom edge of the second surface 61a2 to the near center of the second surface 61a2 continuously along the Z-axis direction. Each of the pair of joint protrusions 681 may extend from the bottom edge of the second surface 61a2 to the near center of the second surface 61a2 intermittently along the Z-axis direction. An outer surface 681a on the positive direction of the Y-axis of one joint protrusion 681 is angled. Similarly, an outer surface 681b on the negative direction of the Y-axis of the other joint protrusion 681 is angled.

Each of the pair of joint protrusions 681 protrudes from the second surface 61a2 outwards in the X-axis direction. One joint protrusion 681 protrudes outwards in the X-axis direction while tilting toward the negative direction of the Y-axis, and the other joint protrusion 681 protrudes outwards in the X-axis direction while tilting toward the positive direction of the Y-axis. That is, the pair of joint protrusions 681 protrudes outwards in the X-axis direction while tilting away from each other in the Y-axis direction, and the distance between the pair of joint protrusions 681 along the Y-axis direction increases as the distance from the second surface 61a2 in the X-axis direction increases.

The outer surface 681a on the positive direction of the Y-axis of one joint protrusion 681 is angled. Similarly, the outer surface 681b on the negative direction of the Y-axis of the other joint protrusion 681 is angled. The outer surfaces 681a and 681b extend outwards in the X-axis direction while tilting away from each other in the Y-axis direction, and the distance between the outer surfaces 681a and 681b along the Y-axis direction increases as the distance from the second surface 61a2 in the X-axis direction increases.

As shown in FIG. 5B, a joint recess 682 formed on the third surface 61a3 is recessed inwards (toward the center) in the Y-axis direction from the third surface 61a3. The joint recess 682 extends from the bottom edge of the third surface 61a3 to the near center of the third surface 61a3 continuously along the Z-axis direction. Along the Z-axis direction, the joint recess 682 has a constant width along the X-axis direction. The joint recess 682 has a predetermined depth along the Y-axis direction. The width of the joint recess 682 along the X-axis direction is wider toward the inner side of the case 60 in the Y-axis direction. That is, the width of the joint recess 682 along the X-axis direction is wider at a deeper location of the joint recess 682, and a horizontal cross section (a cross section parallel to the XY plane) of the joint recess 682 has a substantially trapezoidal shape.

An inner surface 682a on the positive direction of the X-axis of the joint recess 682 is angled. Similarly, an inner surface 682b on the negative direction of the X-axis of the joint recess 682 is angled. The inner surfaces 682a and 682b extend inwards (toward the center) in the Y-axis direction of the case 60 while tilting away from each other in the X-axis direction, and the distance between the inner surfaces 682a and 682b along the X-axis direction increases inwards in the Y-axis direction of the case 60.

A joint recess 682 formed on the fourth surface 61a4 is recessed inwards (toward the center) in the X-axis direction from the fourth surface 61a4. The joint recess 682 extends from the bottom edge of the fourth surface 61a4 to the near center of the fourth surface 61a4 continuously along the Z-axis direction. Along the Z-axis direction, the joint recess 682 has a constant width along the Y-axis direction. The joint recess 682 has a predetermined depth along the X-axis direction. The width of the joint recess 682 along the Y-axis direction is wider toward the inner side of the case 60 in the X-axis direction. That is, the width of the joint recess 682 along the Y-axis direction is wider at a deeper location of the joint recess 682, and a horizontal cross section (a cross section parallel to the XY plane) of the joint recess 682 has a substantially trapezoidal shape.

An inner surface 682a on the negative direction of the Y-axis of the joint recess 682 is angled. Similarly, an inner surface 682b on the positive direction of the Y-axis of the joint recess 682 is angled. The inner surfaces 682a and 682b extend inwards (toward the center) in the X-axis direction of the case 60 while tilting away from each other in the Y-axis direction, and the distance between the inner surfaces 682a and 682b along the Y-axis direction increases inwards in the X-axis direction of the case 60.

When the electronic device 10 includes a plurality of cases 60 (e.g., two cases 60), the joint protrusions 681 and the joint recess 682 provided for each case 60 make it possible to engage the joint protrusions 681 of one case 60 with the joint recess 682 of the other case 60, which enables the cases 60 to be connected.

Figure 9A:
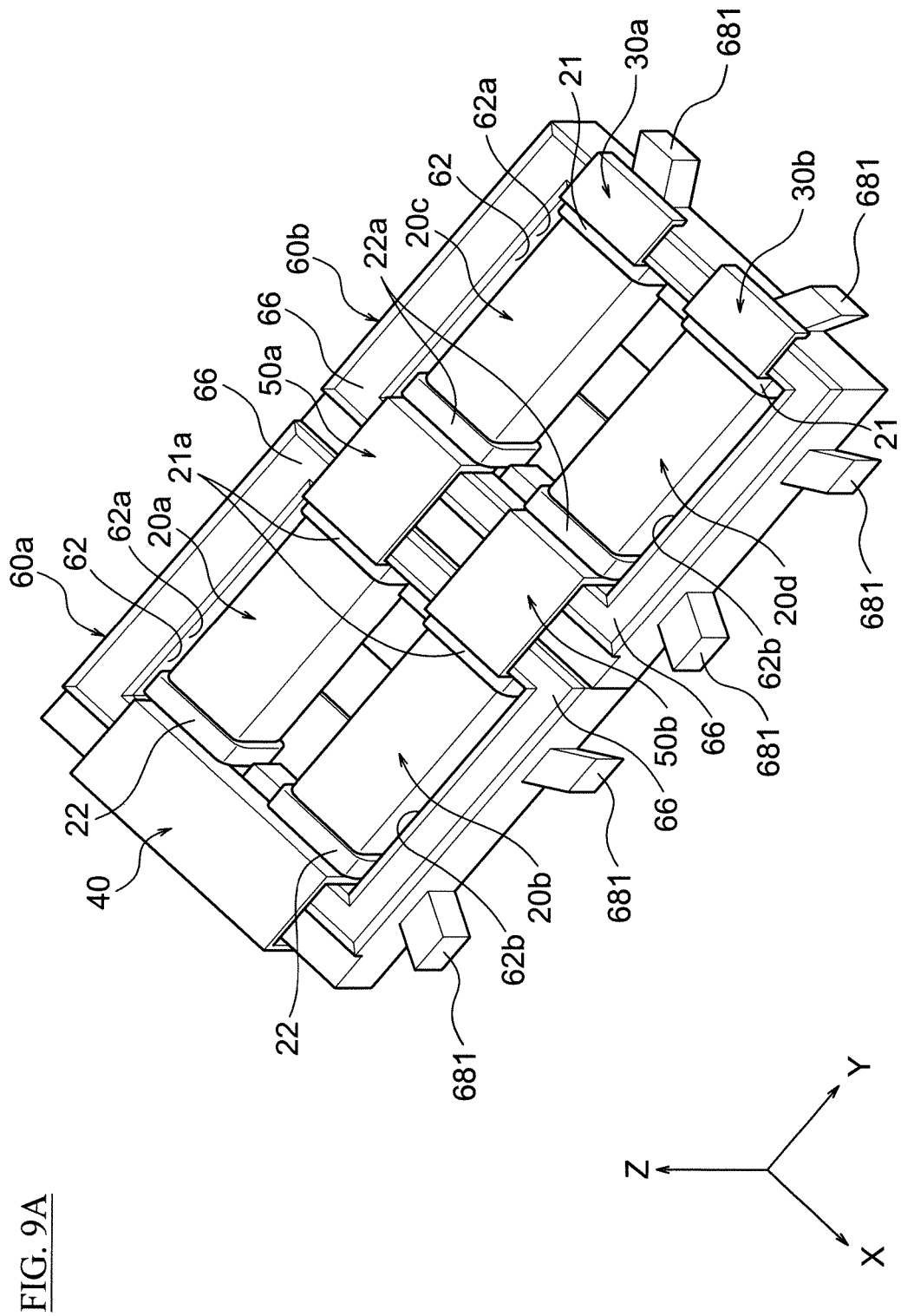
FIG. 9A is a perspective view illustrating a state of the inside of the electronic device shown in FIG. 8.
Figure 9B:
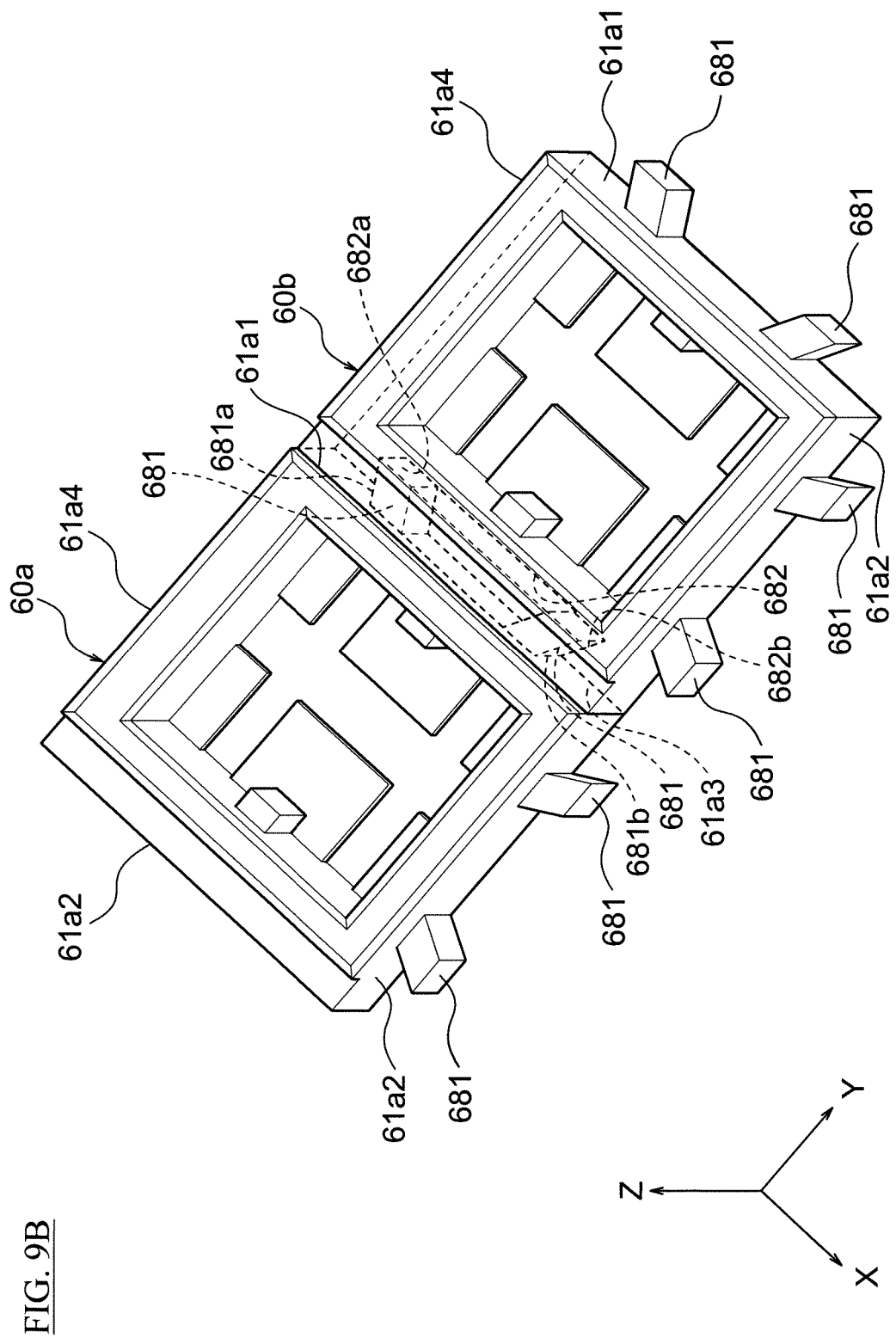
FIG. 9B is a perspective view illustrating a state in which the cases shown in FIG. 9A are connected to each other.

For example, as shown in FIG. 9B, by sliding and inserting a pair of joint protrusions 681 (see FIG. 5A) of a case 60a into a joint recess 682 (see FIG. 5B) of another case 60b from the bottom of the joint recess 682 toward the Z-axis direction (upwards), the pair of joint protrusions 681 of the case 60a enters inside the joint recess 682 of the case 60b. The pair of joint protrusions 681 and the joint recess 682 can thereby engage with each other.

When the pair of joint protrusions 681 of the case 60a is engaged with the joint recess 682 of the case 60b, the outer surface 681a (FIG. 5A) of one joint protrusion 681 and the outer surface 681b of the other joint protrusion 681 are in contact with the inner surface 682a (FIG. 5B) and the inner surface 682b of the joint recess 682 respectively. As described above, the outer surfaces 681a and 681b are angled surfaces that protrude outwards from the case 60a in the Y-axis direction (toward a side at which the case 60b is disposed) and tilt away from each other in the X-axis direction. As described above, the inner surfaces 682a and 682b are angled surfaces that extend inwards in the Y-axis direction of the case 60b (toward a side opposite to the side at which the case 60a is disposed) and tilt away from each other in the X-axis direction. Consequently, the outer surfaces 681a and 681b being in contact with the inner surfaces 682a and 682b enables a strong engagement.

That is, when the pair of joint protrusions 681 of the case 60a is engaged with the joint recess 682 of the case 60b, the cases 60a and 60b do not detach from each other in the Y-axis direction even if a force is applied in the Y-axis direction toward the side at which the case 60a is disposed. This is because the distance in the X-axis direction between the pair of joint protrusions 681 of the case 60a is larger toward the inside (bottom) of the joint recess 682 of the case 60b.

As shown in FIG. 4A, the protrusion 64 is formed inside the accommodation recess 62 and divides (partitions) the accommodation recess 62 along the X-axis direction into the first accommodation space 62a and the second accommodation space 62b. The protrusion 64 is formed at a substantially central portion of the accommodation recess 62 in the X-axis direction so that the volumes of the first accommodation space 62a and the second accommodation space 62b are substantially the same. The protrusion 64 is formed so as to extend from the bottom wall 63 to the inner wall surface 61b of the accommodation recess 62. The inner wall surface 61b includes a first surface 61b1 located in the positive direction of the Y-axis, a second surface 61b2 next to the first surface 61b1 in the clockwise direction, a third surface 61b3 next to the second surface 61b2 in the clockwise direction, and a fourth surface 61b4 next to the third surface 61b3 in the clockwise direction.

The protrusion 64 includes a first protrusion 64a and a second protrusion 64b disposed away from the first protrusion 64a along the Y-axis direction. The first protrusion 64a and the second protrusion 64b have an identical shape, which is a substantially rectangular parallelepiped shape. The first protrusion 64a and the second protrusion 64b are physically separated from each other along the Y-axis direction and extend upwards from the bottom surface (the bottom wall 63) of the accommodation recess 62. The top surface of the first protrusion 64a is flat, and the top surface of the second protrusion 64b is flat.

The first protrusion 64a is formed in the negative direction of the Y-axis in the accommodation recess 62 and protrudes from the third surface 61b3 of the inner wall surface 61b toward the positive direction of the Y-axis as well as from the bottom wall 63 toward the positive direction of the Z-axis. The second protrusion 64b is formed in the positive direction of the Y-axis in the accommodation recess 62, and protrudes from the first surface 61b1 of the inner wall surface 61b toward the negative direction of the Y-axis as well as from the bottom wall 63 toward the positive direction of the Z-axis. The first protrusion 64a and the second protrusion 64b are disposed facing each other in the Y-axis direction.

The first protrusion 64a and the second protrusion 64b are disposed with the communication space 69 provided between the first protrusion 64a and the second protrusion 64b, so that the first accommodation space 62a and the second accommodation space 62b communicate. The communication space 69 is a space located between the first protrusion 64a and the second protrusion 64b and is surrounded by a side surface of the first protrusion 64a facing the positive direction of the Y-axis, a side surface of the second protrusion 64b facing the negative direction of the Y-axis, and the bottom surface of the accommodation recess 62. The communication space 69 is connected to the first accommodation space 62a in the negative direction of the X-axis and is connected to the second accommodation space 62b in the positive direction of the X-axis. The communication space 69 is open upwards. At the location of the communication space 69, which is a recess provided for the protrusion 64, the opening of the communication space 69 faces the same direction as the direction of the opening of the accommodation recess 62. That is, the protrusion 64 of the present embodiment includes a recess at the location of communication space 69, and the recess separates the protrusion 64 into the first protrusion 64a and the second protrusion 64b. The length of the communication space 69 along the Y-axis direction is the same as the distance between the first protrusion 64a and the second protrusion 64b along the Y-axis direction.

As described above, the accommodation recess 62 is filled with the resin 70 (see FIG. 1). Under such a state, the communication space 69 is full of the resin 70. That is, only the resin 70 is present inside the communication space 69, and it is not assumed that members other than the resin 70 are disposed there in the present embodiment. Consequently, the volume of the resin 70 filling the inside of the communication space 69 is substantially the same as the volume of the communication space 69. Also, the shape of the resin 70 filling the inside of the communication space 69 is substantially the same as the shape of the communication space 69.

By filling the communication space 69 with the resin 70, the first protrusion 64a and the second protrusion 64b are connected along the Y-axis direction via the hardened resin 70 (the resin 70 located in the communication space 69). The first accommodation space 62a and the second accommodation space 62b separate from each other in the X-axis direction by the first protrusion 64a, the second protrusion 64b, and the resin 70 (the resin 70 located in the communication space 69). Consequently, when the first accommodation space 62a and the second accommodation space 62b accommodate the chip capacitors 20a and 20b respectively, the chip capacitor 20a disposed in the first accommodation space 62a and the chip capacitor 20b disposed in the second accommodation space 62b can be favorably insulated from one another.

The communication space 69 is used as a space for installing an injection instrument (e.g., a dispenser, a nozzle, and a needle) or a passage through which the resin 70 flows when the resin 70 fills the accommodation recess 62. That is, the accommodation recess 62 can be filled with the resin 70 by installing (inserting) the injection instrument between the first protrusion 64a and the second protrusion 64b (in the communication space 69) and injecting the resin 70 into the communication space 69 with the injection instrument.

Figure 4B:
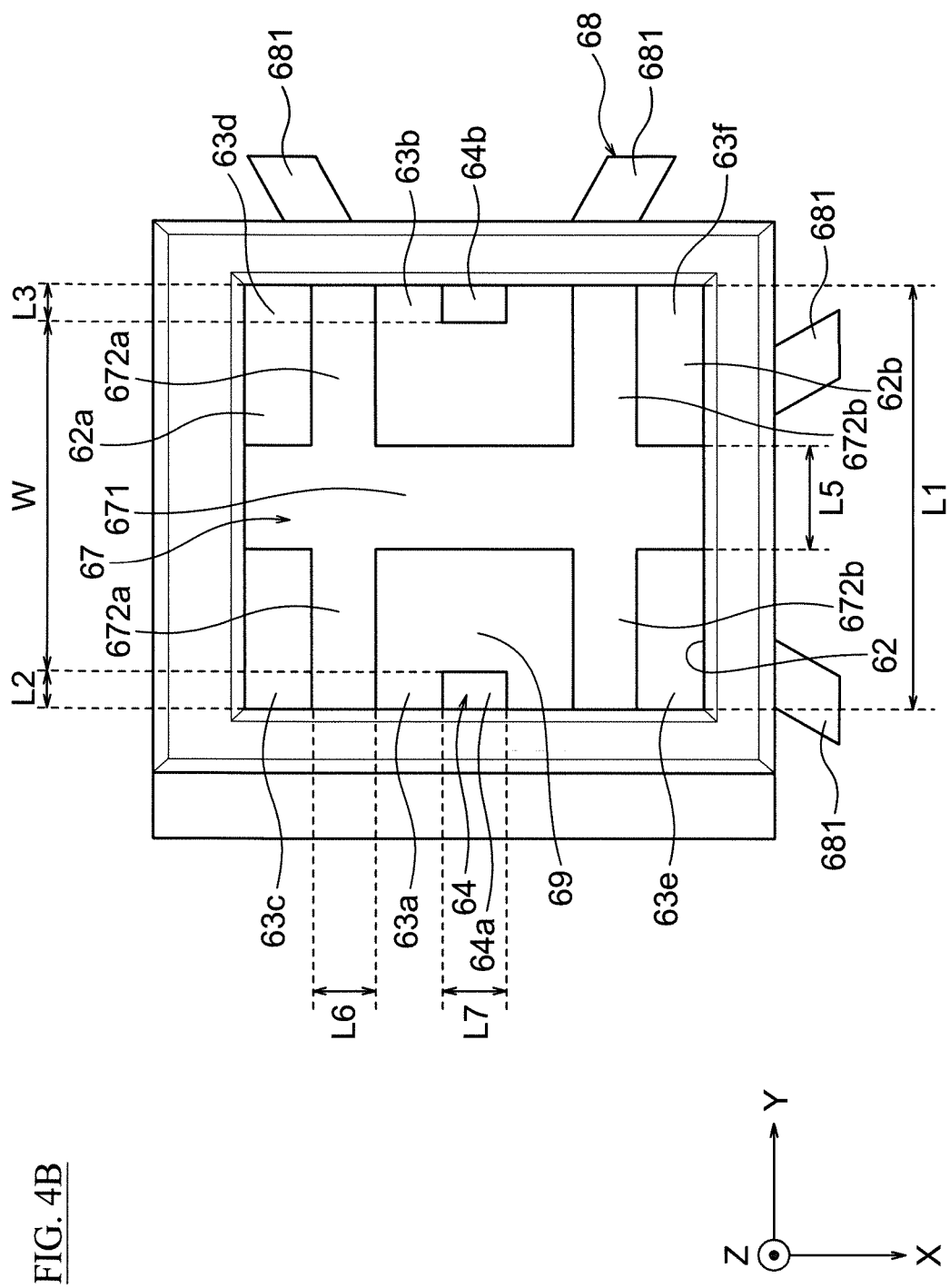
FIG. 4B is a plan view of the case shown in FIG. 4A.

As shown in FIG. 4B, the ratio of the distance W between the first protrusion 64a and the second protrusion 64b (the length of the communication space 69 along the Y-axis direction) to the length L1 of the accommodation recess 62 along the Y-axis direction, or W/L1, is preferably $1/16<W/L1<1$, more preferably $1/8<W/L1<1$, and most preferably $1/4<W/L1<9/10$. By setting the value of the ratio W/L1 within the above-mentioned range, the communication space 69 that is relatively wide is formed between the first protrusion 64a and the second protrusion 64b. Consequently, the injection instrument is readily installed in between the first protrusion 64a and the second protrusion 64b, and a treatment for filling the accommodation recess 62 with the resin is readily carried out. Also, the resin 70 readily flows into both the first accommodation space 62a and the second accommodation space 62b from the communication space 69. The value of the ratio W/L1 may be appropriately modified in accordance with the size of the injection instrument to be installed in between the first protrusion 64a and the second protrusion 64b.

The length L1 of the accommodation recess 62 along the Y-axis direction is substantially the same as the length of the chip capacitor 20a (20b) along its lengthwise direction (the longitudinal direction or the Y-axis direction) shown in FIG. 3. To be more accurate, the length L1 is substantially the same as the sum of the length of the chip capacitor 20a (20b) along its lengthwise direction, the thickness of the first individual metal terminal 30a or the second individual metal terminal 30b shown in FIG. 2, and the thickness of the common metal terminal 40 shown in FIG. 2.

The distance W between the first protrusion 64a and the second protrusion 64b (the length of the communication space 69 along the Y-axis direction) may be equivalent to or greater than the length L2 of the first protrusion 64a along the Y-axis direction or the length L3 of the second protrusion 64b along the Y-axis direction. The distance W between the first protrusion 64a and the second protrusion 64b may also be equivalent to or greater than the sum of the length L2 of the first protrusion 64a along the Y-axis direction and the length L3 of the second protrusion 64b along the Y-axis direction. Even if W≥L2, W≥L3, or W≥L2+L3 is satisfied as described above, the relatively wide communication space 69 is formed between the first protrusion 64a and the second protrusion 64b, and the above-mentioned effects can be achieved.

The distance W between the first protrusion 64a and the second protrusion 64b (the length of the communication space 69 along the Y-axis direction) may be equivalent to or greater than the thickness L7 of the first protrusion 64a or the second protrusion 64b along the X-axis direction. By satisfying W≥L7, the communication space 69 providing enough space for installing the injection instrument can be formed between the first protrusion 64a and the second protrusion 64b. Consequently, the injection instrument is readily installed in the communication space 69, and the treatment for filling the accommodation recess 62 with the resin 70 is readily carried out.

The ratio of the length L2 of the first protrusion 64a along the Y-axis direction to the length L1 of the accommodation recess 62 along the Y-axis direction, or L2/L1, is preferably $1/32 \leq L2/L1 < 1/2$, more preferably $1/32 \leq L2/L1 < 3/8$, and most preferably $1/16 \leq L2/L1 < 1/4$. The same applies to the ratio of the length L3 of the second protrusion 64b along the Y-axis direction to the length L1 of the accommodation recess 62 along the Y-axis direction, or L3/L1. By setting the value of L2/L1 or L3/L1 within the above-mentioned range, the relatively wide communication space 69 is formed between the first protrusion 64a and the second protrusion 64b, and the above-mentioned effects can be achieved.

The sum of the length L2 of the first protrusion 64a along the Y-axis direction and the length L3 of the second protrusion 64b along the Y-axis direction is smaller than the length L1 of the accommodation recess 62 along the Y-axis direction. Satisfying a relationship of L2>0, L3>0, and L2+L3<L1 is a condition for forming the communication space 69 between the first protrusion 64a and the second protrusion 64b. By satisfying preferably L2+L3<L1/L2, the relatively wide communication space 69 is formed between the first protrusion 64a and the second protrusion 64b, and the above-mentioned effects can be achieved. While the length L2 of the first protrusion 64a along the Y-axis direction is equivalent to the length L3 of the second protrusion 64b along the Y-axis direction, L2>L3 or L3>L2 may be satisfied. In that case, the communication space 69 is formed at a location closer to one or the other side in the Y-axis direction.

The length L2 of the first protrusion 64a along the Y-axis direction may be equivalent to or smaller than the length L4 of the second side surface electrode portion 22b of the second terminal electrode 22 of the chip capacitor 20a (20b) in the Y-axis direction shown in FIG. 3. The same applies to the length L3 of the second protrusion 64b along the Y-axis direction. As shown in FIG. 2, the second side surface electrode portion 22b of the second terminal electrode 22 of the chip capacitor 20a and the second side surface electrode portion 22b of the second terminal electrode 22 of the chip capacitor 20b are disposed facing each other in the X-axis direction, sandwiching the first protrusion 64a in between. Likewise, the first side surface electrode portion 21b of the first terminal electrode 21 of the chip capacitor 20a and the first side surface electrode portion 21b of the first terminal electrode 21 of the chip capacitor 20b are disposed facing each other in the X-axis direction, sandwiching the second protrusion 64b in between. Even if 0<L2≤L4 or 0<L3≤L4 is satisfied and the first protrusion 64a or the second protrusion 64b is relatively small, contact between the first side surface electrode portion 21b of the first terminal electrode 21 of the chip capacitor 20a and the first side surface electrode portion 21b of the first terminal electrode 21 of the chip capacitor 20b can be sufficiently prevented, and a sufficient insulation distance between them can be ensured. The first side surface electrode portions 21b can thus be favorably insulated from one another.

Figure 6:
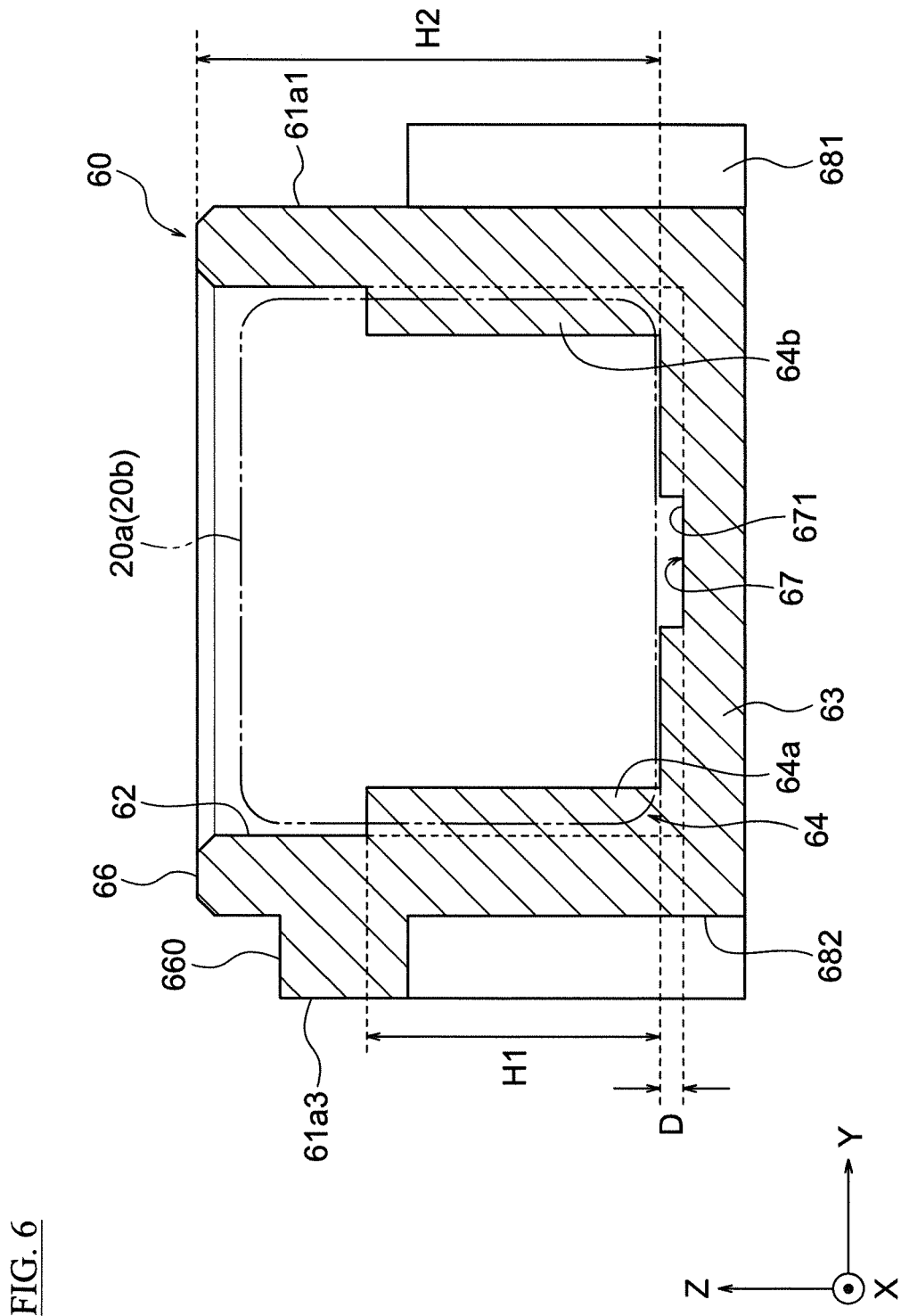
FIG. 6 is a cross-sectional view of the case shown in FIG. 4A along the VI-VI line.

As shown in FIG. 6, the ratio of the height H1 of the first protrusion 64a to the height H2 of the accommodation recess 62 (the height from the bottom surface of the accommodation recess 62 to its opening), or H1/H2, is preferably ½≤H1/H2<⅞ and more preferably ½≤H1/H2≤¾. The same applies to the ratio of the height of the second protrusion 64b to the height of the accommodation recess 62. By setting the value of H1/H2 within the above-mentioned range, the first protrusion 64a has a relatively small volume, which enables the accommodation recess 62 to have a relatively large volume and to be filled with a sufficient amount of the resin 70. Also, by setting the value of H1/H2 within the above-mentioned range, a connection portion 48 of the common metal terminal 40 shown in FIG. 7 to be disposed at the top surface of the first protrusion 64a can be stably disposed at the top surface of the first protrusion 64a.

The height H1 of the first protrusion 64a may be smaller than the height (thickness) of the chip capacitors 20a and 20b. The first protrusion 64a and the second protrusion 64b have a feature of insulating the chip capacitors 20a and 20b from one another by positioning the chip capacitors 20a and 20b accommodated in the accommodation recess 62 (by preventing misalignment of the chip capacitors 20a and 20b). Consequently, it is only required that the height H1 of the first protrusion 64a is tall enough for the first protrusion 64a to exhibit the feature. The same applies to the second protrusion 64b.

As shown in FIG. 4A, the bottom surface groove 67 is formed on the bottom surface of the accommodation recess 62 (the top surface of the bottom wall 63). The bottom surface groove 67 runs between the first protrusion 64a and the second protrusion 64b and extends toward outer edges of the bottom surface of the accommodation recess 62. The bottom surface groove 67 on the bottom surface of the accommodation recess 62 is in a mesh pattern, and ends of the bottom surface groove 67 meet the inner wall surface 61b of the accommodation recess 62.

The bottom surface groove 67 functions as a passage through which the resin 70 flows when the treatment for filling the accommodation recess 62 with the resin 70 is carried out. That is, the resin 70 injected into the communication space 69 with the injection instrument flows inside the bottom surface groove 67 toward the outer edges of the bottom surface of the accommodation recess 62. The resin 70 can thus spread toward the outer edges of the bottom surface of the accommodation recess 62 effectively. The bottom surface groove 67 includes a first bottom surface groove 671 extending along the X-axis direction between the first protrusion 64a and the second protrusion 64b, and a second bottom surface groove 672 extending along the Y-axis direction so that the second bottom surface groove 672 is connected to the first bottom surface groove 671.

On the bottom surface of the accommodation recess 62, one first bottom surface groove 671 extending from one end to the other end of the bottom surface in the X-axis direction is formed. However, two or more such first bottom surface grooves 671 may be formed. Also, on the bottom surface of the accommodation recess 62, two second bottom surface grooves 672 extending from one end to the other end of the bottom surface in the Y-axis direction are formed. However, the number of the second bottom surface grooves 672 may be one or may be three or more.

As shown in FIG. 4B, the first bottom surface groove 671 includes one groove extending linearly along the X-axis direction on the bottom surface of the accommodation recess 62 and is formed at the substantially central portion of the bottom surface of the accommodation recess 62 in the Y-axis direction. The first bottom surface groove 671 extends from one end to the other end of the bottom surface of the accommodation recess 62 in the X-axis direction and is connected to the inner wall surface of the accommodation recess 62 in the negative and positive directions of the X-axis. The ratio of the width L5 of the first bottom surface groove 671 along the Y-axis direction to the distance W between the first protrusion 64a and the second protrusion 64b (the length of the communication space 69 along the Y-axis direction), or L5/W, is preferably ¹⁄₁₆≤L5/W<1 and is more preferably ⅛≤L5/W≤½. By setting the value of L5/W within the above-mentioned range, the resin 70 readily flows inside the first bottom surface groove 671 in a smooth manner and can spread toward the outer edges of the bottom surface of the accommodation recess 62 effectively.

The width L5 of the first bottom surface groove 671 along the Y-axis direction is not necessarily constant along the X-axis direction and may change at a location of the first bottom surface groove 671 along the X-axis direction. In this case, the width L5 may be wider than the distance W between the first protrusion 64a and the second protrusion 64b (the length of the communication space 69 along the Y-axis direction).

As shown in FIG. 6, when the accommodation recess 62 accommodates the chip capacitors 20a and 20b, a clearance (space) according to the depth D of the first bottom surface groove 671 is formed along the X-axis direction in between the bottom wall 63 and side surfaces (the bottom surfaces) of the chip capacitors 20a and 20b, at the location of the first bottom surface groove 671. The resin 70 filling the inside of the accommodation recess 62 flows inside this clearance along the X-axis direction and hardens inside this clearance. That is, the resin 70 fills not only the lateral or top sides of the chip capacitors 20a and 20b but also the bottom side of the chip capacitors 20a and 20b, and a resin layer composed of the resin 70 is formed under the chip capacitors 20a and 20b.

The ratio of the depth D of the first bottom surface groove 671 to the height H2 of the accommodation recess 62 (the height from the bottom surface of the accommodation recess 62 to its opening), or D/H2, is preferably $1/64 \leq D/H2 \leq 1/8$ and is more preferably $1/32 \leq D/H2 \leq 1/16$. By setting the value of D/H2 or the value of D within the above-mentioned range, the resin 70 can flow inside the first bottom surface groove 671 in a smooth manner.

As shown in FIG. 4B, the second bottom surface groove 672 includes a groove extending linearly along the Y-axis direction on the bottom surface of the accommodation recess 62. The second bottom surface groove 672 is substantially orthogonal to and intersect with the first bottom surface groove 671. In the present embodiment, a second bottom surface groove 672a and a second bottom surface groove 672b are formed on the bottom surface of the accommodation recess 62 as the second bottom surface groove 672. The second bottom surface groove 672a is formed in the negative direction of the X-axis from the protrusion 64, and the second bottom surface groove 672b is formed in the positive direction of the X-axis from the protrusion 64.

The second bottom surface groove 672a is formed at the substantially central portion of the bottom surface of the accommodation recess 62 in the X-axis direction in the first accommodation space 62a. The second bottom surface groove 672a extends from one end to the other end of the bottom surface of the accommodation recess 62 in the Y-axis direction and is connected to the inner wall surface of the accommodation recess 62 in the negative and positive directions of the Y-axis. The second bottom surface groove 672b is formed at the substantially central portion of the bottom surface of the accommodation recess 62 in the X-axis direction in the second accommodation space 62b. The second bottom surface groove 672b extends from one end to the other end of the bottom surface of the accommodation recess 62 in the Y-axis direction.

Immediately after the resin 70 is injected into the communication space 69 (toward the first bottom surface groove 671) with the injection instrument, the resin 70 injected through the communication space 69 flows directly into the first bottom surface groove 671, whereas the resin 70 having flowed through the first bottom surface groove 671 diverges and flows into the second bottom surface groove 672. The amount of the resin 70 that flows in the second bottom surface groove 672 (the second bottom surface groove 672a/the second bottom surface groove 672b) is thus smaller than the amount of the resin 70 that flows in first bottom surface groove 671. Consequently, the width L6 of the second bottom surface groove 672 along the X-axis direction may be smaller than the width L5 of the first bottom surface groove 671 along the Y-axis direction.

The width L6 of the second bottom surface groove 672 along the X-axis direction is not necessarily constant along the Y-axis direction and may change at a location of the second bottom surface groove 672 along the Y-axis direction.

Although a detailed figure is omitted, when the accommodation recess 62 accommodates the chip capacitors 20a and 20b, a clearance (space) according to the depth of the second bottom surface groove 672 is formed along the Y-axis direction in between the bottom wall 63 and the side surfaces (the bottom surfaces) of the chip capacitors 20a and 20b, at the location of the second bottom surface groove 672. The resin 70 filling the accommodation recess 62 flows inside this clearance along the Y-axis direction and hardens inside this clearance. This forms a resin layer under the chip capacitors 20a and 20b. The depth of the second bottom surface groove 672 is the same as the depth of the first bottom surface groove 671, but may be shallower than the depth of the first bottom surface groove 671.

The intersection of the first bottom surface groove 671 and the second bottom surface groove 672a is disposed under the chip capacitor 20a accommodated in the first accommodation space 62a. Likewise, the intersection of the first bottom surface groove 671 and the second bottom surface groove 672b is disposed under the chip capacitor 20b accommodated in the second accommodation space 62b.

Because the first bottom surface groove 671, the second bottom surface groove 672a, and the second bottom surface groove 672b are formed on the bottom surface of the accommodation recess 62, a first step surface 63a, a second step surface 63b, a third step surface 63c, a fourth step surface 63d, a fifth step surface 63e, and a sixth step surface 63f are formed on the bottom surface of the accommodation recess 62. The height of the step surfaces 63a to 63f corresponds to the depth of the first bottom surface groove 671, the second bottom surface groove 672a, and the second bottom surface groove 672b. The width of the step surfaces 63a to 63f along the Y-axis direction and the width thereof along the X-axis direction are determined in accordance with the width of or the distance between the first bottom surface groove 671, the second bottom surface groove 672a, and the second bottom surface groove 672b.

The first protrusion 64a is disposed on the first step surface 63a, and the second protrusion 64b is disposed on the second step surface 63b. In the first accommodation space 62a, the chip capacitor 20a is installed over the first step surface 63a, the second step surface 63b, the third step surface 63c, and the fourth step surface 63d. Likewise, in the second accommodation space 62b, the chip capacitor 20b is installed over the first step surface 63a, the second step surface 63b, the fifth step surface 63e, and the sixth step surface 63f. Because the step surfaces 63a to 63f are flat, the chip capacitors 20a and 20b can be installed on these step surfaces in a stable manner.

Figure 7:
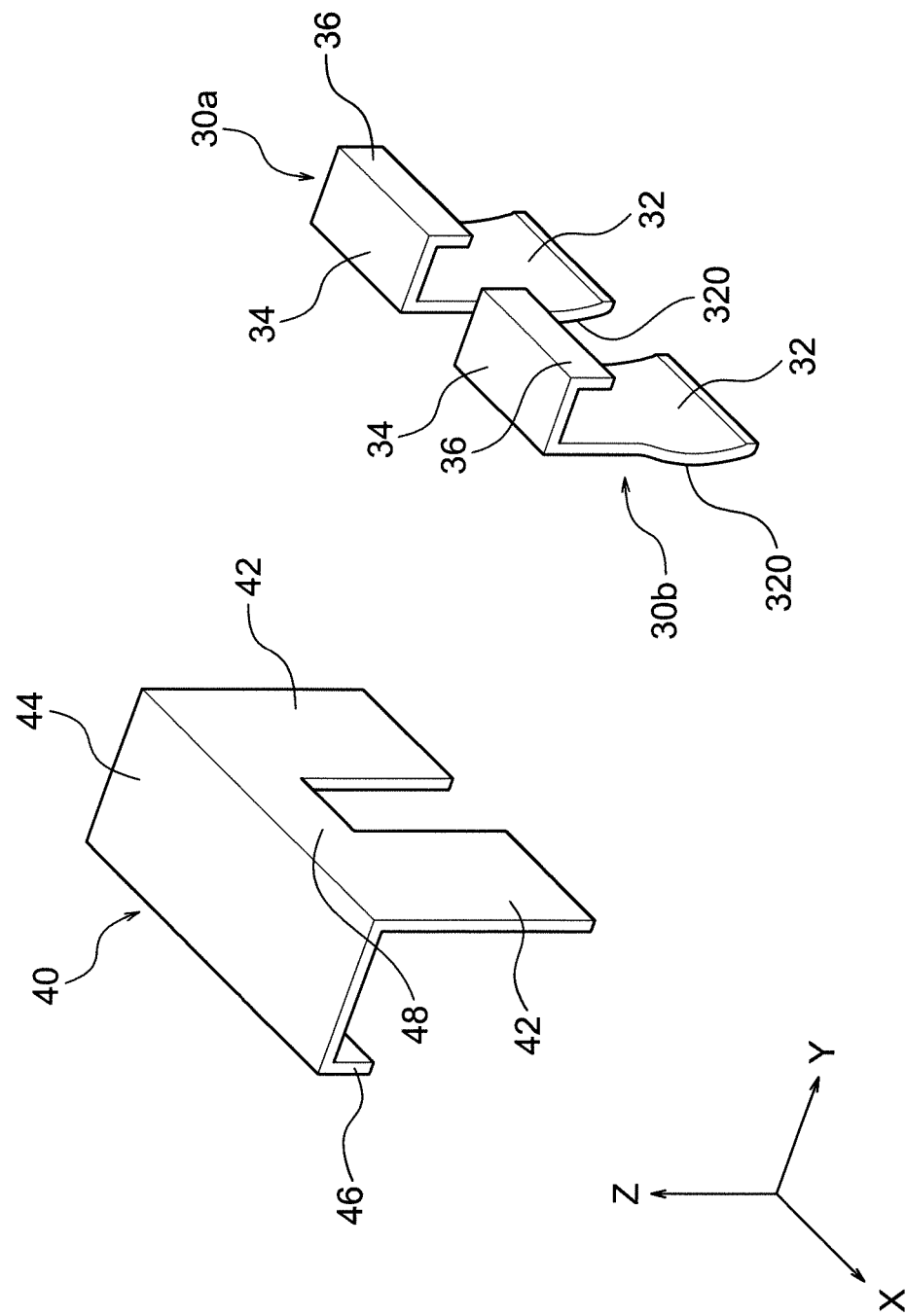
FIG. 7 is a perspective view of the conductive terminals shown in FIG. 1.

As shown in FIG. 7, the first individual metal terminal 30a and the second individual metal terminal 30b are each formed by bending a single tabular conductive plate piece (e.g., a metal plate). The thickness of the metal plate is not limited but is preferably about 0.01 mm to about 2.0 mm. The material of the metal plate is not limited as long as it is a conductive metal material. For example, iron, nickel, copper, silver, or an alloy containing thereof can be used. On a surface of the first individual metal terminal 30a and a surface of the second individual metal terminal 30b, a metal film including Ni, Sn, Cu, etc. may be formed by plating. The first individual metal terminal 30a and the second individual metal terminal 30b may be composed of conductive terminals made of a conductive material other than metal. The same applies to the common metal terminal 40 described later and to a first connection metal terminal 50a and a second connection metal terminal 50b described in a second embodiment.

As shown in FIGS. 2 and 7, the first individual metal terminal 30a and the second individual metal terminal 30b are attached to the opening edge surface 66 of the case 60 in the positive direction of the Y-axis. The first individual metal terminal 30a and the second individual metal terminal 30b are disposed side by side in the X-axis direction. The first individual metal terminal 30a is electrically connected to the chip capacitor 20a accommodated in the first accommodation space 62a of the accommodation recess 62. The second individual metal terminal 30b is electrically connected to the chip capacitor 20b accommodated in the second accommodation space 62b of the accommodation recess 62.

The first individual metal terminal 30a and the second individual metal terminal 30b each include an inner electrode portion 32, an opening edge electrode portion 34, and a side electrode portion 36. The inner electrode portion 32 of the first individual metal terminal 30a is inserted along the inner wall surface of the first accommodation space 62a of the case 60 in the positive direction of the Y-axis, and is in contact with and electrically connected to the first terminal electrode 21 of the chip capacitor 20a. The width of the inner electrode portion 32 of the first individual metal terminal 30a along the X-axis direction is substantially the same as the width of the first terminal electrode 21 of the chip capacitor 20a along the X-axis direction.

The inner electrode portion 32 of the second individual metal terminal 30b is inserted along the inner wall surface of the second accommodation space 62b of the case 60 in the positive direction of the Y-axis, and is in contact with and electrically connected to the first terminal electrode 21 of the chip capacitor 20b. The width of the inner electrode portion 32 of the second individual metal terminal 30b along the X-axis direction is substantially the same as the width of the first terminal electrode 21 of the chip capacitor 20b along the X-axis direction.

Each inner electrode portion 32 includes a curved portion 320. Each curved portion 320 applies a spring force to the chip capacitor 20a or the chip capacitor 20b accommodated in the accommodation recess 62. This enables the capacitor chips 20a and 20b to be firmly fixed to the inside of the accommodation recess 62.

The opening edge electrode portion 34 is formed continuously to the inner electrode portion 32 and disposed along the opening edge surface 66 of the case 60. The opening edge electrode portion 34 is preferably in contact with the opening edge surface 66. However, there may be a gap between the opening edge electrode portion 34 and the opening edge surface 66.

The side electrode portion 36 is formed continuously to the opening edge electrode portion 34 and disposed along (fixed to) the outer wall 61 (the outer surface 61a) of the case 60. Sandwiching an upper portion of the outer wall 61 between the side electrode portion 36 and the inner electrode portion 32 enables the first individual metal terminal 30a or the second individual metal terminal 30b to be fixed to the case 60.

The common metal terminal 40 is attached to the opening edge surface 66 of the case 60 in the negative direction of the Y-axis. The common metal terminal 40 is electrically connected to the chip capacitor 20a accommodated in the first accommodation space 62a of the accommodation recess 62 and the chip capacitor 20b accommodated in the second accommodation space 62b of the accommodation recess 62. The common metal terminal 40 includes a pair of inner electrode portions 42, an opening edge electrode portion 44, a side electrode portion 46, and the connection portion 48.

Each of the pair of inner electrode portions 42 is formed side by side in the X-axis direction. One inner electrode portion 42 is inserted along the inner wall surface of the first accommodation space 62a of the case 60 in the negative direction of the Y-axis, and is in contact with and electrically connected to the second terminal electrode 22 of the chip capacitor 20a. The width of the one inner electrode portion 42 along the X-axis direction is substantially the same as the width of the second terminal electrode 22 of the chip capacitor 20a along the X-axis direction.

The other inner electrode portions 42 is inserted along the inner wall surface of the second accommodation space 62b of the case 60 in the negative direction of the Y-axis, and is in contact with and electrically connected to the second terminal electrode 22 of the chip capacitor 20b. The width of the other inner electrode portion 42 along the X-axis direction is substantially the same as the width of the second terminal electrode 22 of the chip capacitor 20b along the X-axis direction.

The pair of inner electrode portions 42 is disposed so that the outer surfaces of the first protrusion 64a in the positive and negative directions of the X-axis are sandwiched in between. Unlike the first individual metal terminal 30a and the second individual metal terminal 30b, each inner electrode portion 42 does not include a portion equivalent to the curved portion 320. However, each inner electrode portion 42 may include such an equivalent portion.

The opening edge electrode portion 44 is formed continuously to the inner electrode portions 42 and disposed along the opening edge surface 66 of the case 60. The side electrode portion 46 is formed continuously to the opening edge electrode portion 44 and disposed along (fixed to) the outer wall 61 (the outer surface 61a) of the case 60. Sandwiching an upper portion of the outer wall 61 between the side electrode portion 46 and the inner electrode portions 42 enables the common metal terminal 40 to be fixed to the case 60. The side electrode portion 46 may be disposed along the vertical surface (the surface parallel to the YZ plane) of the step portion 660 formed at a part of the opening edge surface 66.

The connection portion 48 connects upper portions of the inner electrode portions 42 in the X-axis direction and is disposed along the inner wall surface 61b (the third surface 61b3) of the accommodation recess 62 of the case 60. The connection portion 48 is disposed above the first protrusion 64a, and the bottom end of the connection portion 48 is in contact with the top surface of the first protrusion 64a. Consequently, the top surface of the first protrusion 64a and the outer surfaces of the first protrusion 64a in the positive and negative directions of the X-axis direction are surrounded by the connection portion 48 and the pair of inner electrode portions 42.

By connecting the first individual metal terminal 30a to the first terminal electrode 21 of the chip capacitor 20a, the second individual metal terminal 30b to the first terminal electrode 21 of the chip capacitor 20b, and the common metal terminal 40 to the second terminal electrode 22 of each of the chip capacitors 20a and 20b, the chip capacitors 20a and 20b can be connected in series inside the case 60.

In the electronic device 10 according to the present embodiment, the communication space 69 is formed in between the first protrusion 64a and the second protrusion 64b as shown in FIG. 4A. Thus, by installing the injection instrument between the first protrusion 64a and the second protrusion 64b (i.e., in the communication space 69) and injecting the resin 70, the accommodation recess 62 can be filled with the resin 70 injected through the communication space 69. Consequently, the accommodation recess 62 can be filled with a sufficient amount of the resin 70 in a short amount of time without the flow of the resin 70 being prevented by the protrusion, and an overflow of the resin 70 from the opening of the accommodation recess 62 can be prevented.

The resin 70 injected into the communication space 69 with the injection instrument diverges and flows from the communication space 69 toward the negative and positive directions of the X-axis in the first accommodation space 62a and the second accommodation space 62b. Both the first accommodation space 62a and the second accommodation space 62b can thus be filled with the resin 70 by performing the treatment for filling the accommodation recess 62 with the resin 70 once. Because the first accommodation space 62a and the second accommodation space 62b do not need to be separately filled with the resin 70, productivity of manufacturing the electronic device 10 can be improved. Also, because a substantially constant amount of the resin 70 flows in the first accommodation space 62a and the second accommodation space 62b from the communication space 69, a substantially equal amount of the resin 70 can fill the first accommodation space 62a and the second accommodation space 62b.

In the present embodiment, the first protrusion 64a and the second protrusion 64b are separated from each other along the Y-axis direction and extend upwards from the bottom surface of the accommodation recess 62 (the top surface of the bottom wall 63). The communication space 69 extending along the Z-axis direction from the opening to the bottom surface of the accommodation recess 62 is thus formed between the first protrusion 64a and the second protrusion 64b. Through the communication space 69, the injection instrument can be inserted to reach the vicinity of the bottom surface of the accommodation recess 62. As the resin 70 is injected in the communication space 69 from the vicinity of the bottom surface of the accommodation recess 62, the resin 70 fills the accommodation recess 62 due to pressure applied at the time of injection, gradually from the bottom surface to the opening of the accommodation recess 62. The overflow of the resin 70 from the accommodation recess 62 can thus be effectively prevented, unlike when the resin 70 is injected from the vicinity of the opening of the accommodation recess 62. Also, time necessary for filling the accommodation recess 62 with the resin 70 can be effectively reduced, and the first accommodation space 62a and the second accommodation space 62b can each be filled with an effectively equalized amount of the resin 70.

In the present embodiment, the resin 70 injected into the communication space 69 with the injection instrument flows inside the first bottom surface groove 671 along the X-axis direction toward the outer edges of the bottom surface of the accommodation recess 62, diverges from the first bottom surface groove 671, and flows inside the second bottom surface grooves 672 along the Y-axis direction. Consequently, the resin 70 can spread toward the outer edges of the bottom surface of the accommodation recess 62 in the Y-axis and X-axis directions effectively.

Second Embodiment

Figure 8:
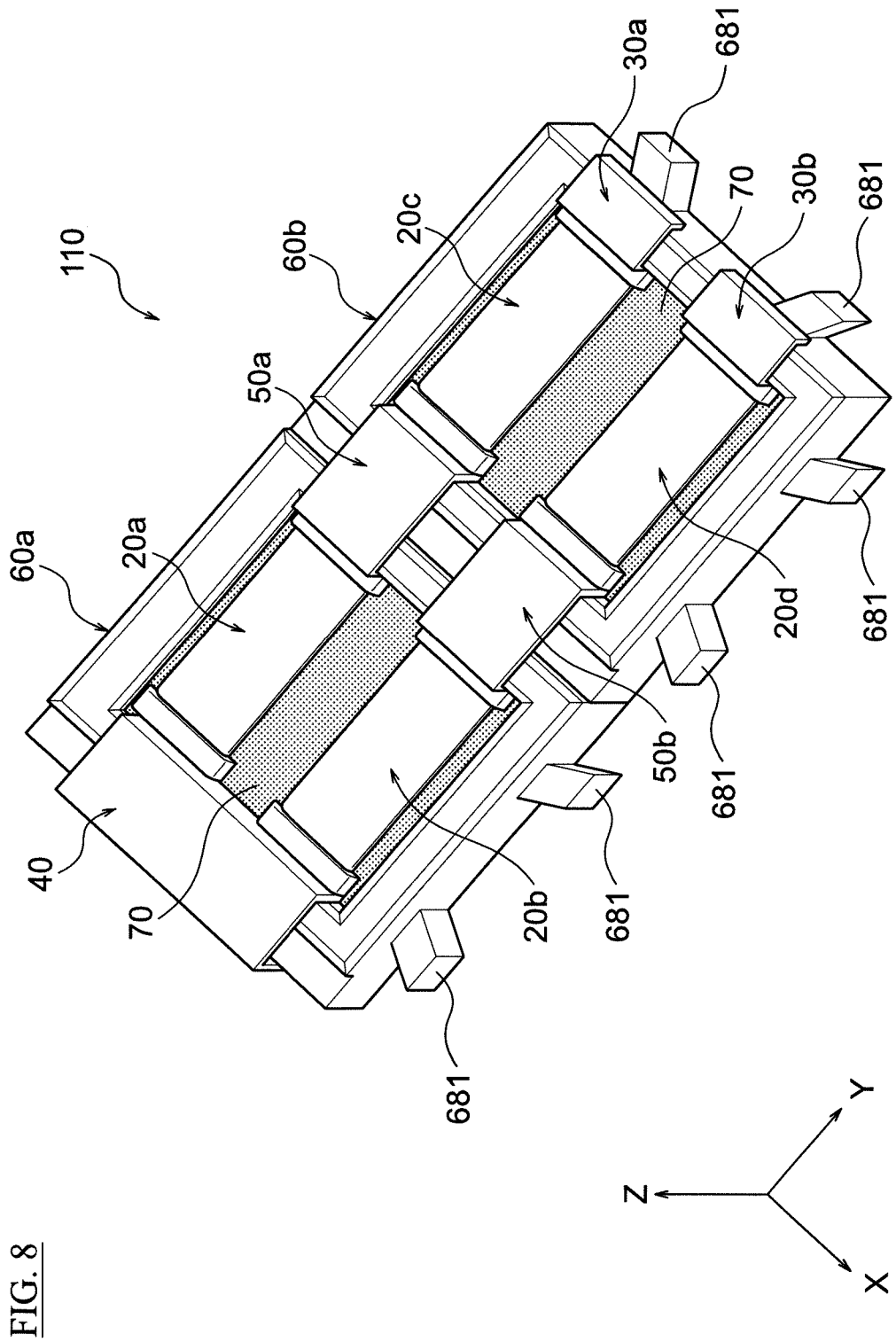
FIG. 8 is a perspective view of an electronic device according to a second embodiment of the present invention.
Figure 10:
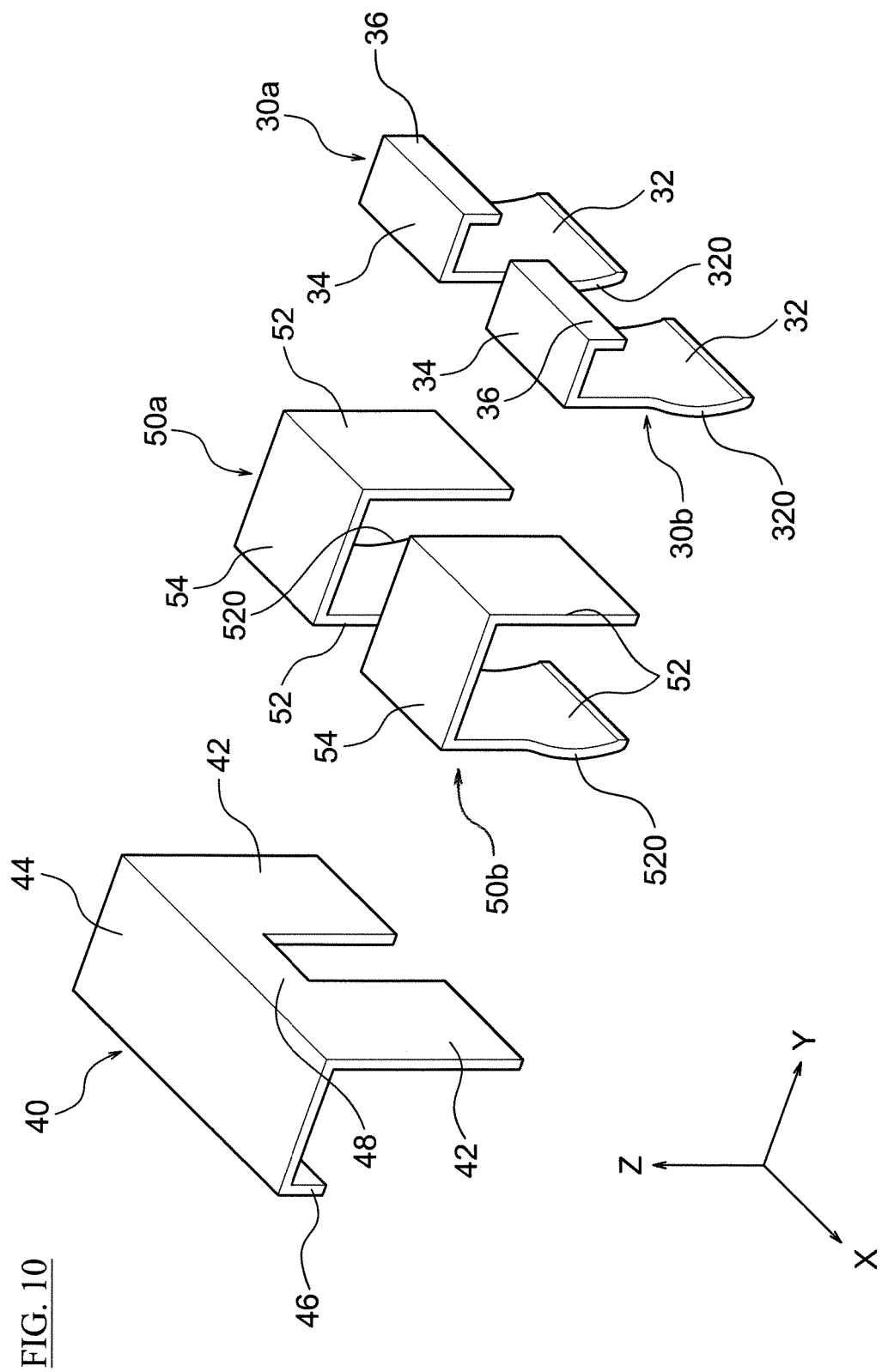
FIG. 10 is a perspective view of the conductive terminals shown in FIG. 8.

An electronic device 110 according to a second embodiment of the present invention shown in FIGS. 8 to 10 has the same structure as the electronic device 10 according to the first embodiment except for the following matters and exhibits the same effects. In the figures, the members common to those of the electronic device 10 according to the first embodiment are given the common reference numerals, and their description is partly omitted.

As shown in FIG. 8, the electronic device 110 includes a case 60a and a case 60b, which are connected together. The case 60a and the case 60b each have the same structure as the case 60 of the first embodiment. As shown in FIG. 9A, a first accommodation space 62a and a second accommodation space 62b of an accommodation recess 62 of the case 60a accommodate a chip capacitor 20a and a chip capacitor 20b respectively. A first accommodation space 62a and a second accommodation space 62b of an accommodation recess 62 of the case 60b accommodate a chip capacitor 20c and a chip capacitor 20d respectively.

As shown in FIG. 9B, a pair of joint protrusions 681 formed on a first surface 61a1 of an outer surface 61a of the case 60a engages with a joint recess 682 formed on a third surface 61a3 of an outer surface 61a of the case 60b. Their engagement mechanism is omitted for being described in the first embodiment.

The number of the cases 60 connected is not limited to two and may be three or more. For example, a pair of joint protrusions 681 formed on a second surface 61a2 of the outer surface 61a of the case 60a may engage with a joint recess 682 (see FIG. 5B) formed on a fourth surface 61a4 of an outer surface 61a of another case 60. Further, a joint recess 682 (not shown in the figure) formed on a fourth surface 61a4 of the outer surface 61a of the case 60a may engage with a pair of joint protrusions 681 (see FIG. 5A) formed on a second surface 61a2 of an outer surface 61a of still another case 60. Similarly, other cases 60 may be connected to the case 60b.

As shown in FIG. 9A, when the cases 60a and 60b are connected via the joint portion 68, the electronic device 110 has a first connection metal terminal 50a and a second connection metal terminal 50b, which are conductive terminals for electrically connecting the chip capacitors 20a and 20b accommodated in the case 60a and the chip capacitors 20c and 20d accommodated in the case 60b.

As shown in FIG. 10, the first connection metal terminal 50a and the second connection metal terminal 50b each include a pair of inner electrode portions 52 and a connecting portion 54 that connects the pair of inner electrode portions 52. Each of the pair of inner electrode portions 52 is integrally connected to one end and the other end of the connecting portion 54 in the Y-axis direction. Among the pair of inner electrode portions 52, one inner electrode portion 52 includes a curved portion 520, and the other inner electrode portion 52 may also include a curved portion 520.

As shown in FIGS. 9A and 10, one inner electrode portion 52 of the first connection metal terminal 50a is inserted along the inner wall surface in the positive direction of the Y-axis of the first accommodation space 62a of the case 60a, and is in contact with and electrically connected to the first terminal electrode 21 of the chip capacitor 20a. The other inner electrode portion 52 of the first connection metal terminal 50a is inserted along the inner wall surface in the negative direction of the Y-axis of the first accommodation space 62a of the case 60b, and is in contact with and electrically connected to the second terminal electrode 22 of the chip capacitor 20c.

One inner electrode portion 52 of the second connection metal terminal 50b is inserted along the inner wall surface in the positive direction of the Y-axis of the second accommodation space 62b of the case 60a, and is in contact with and electrically connected to the first terminal electrode 21 of the chip capacitor 20b. The other inner electrode portion 52 of the second connection metal terminal 50b is inserted along the inner wall surface in the negative direction of the Y-axis of the second accommodation space 62b of the case 60b, and is in contact with and electrically connected to the second terminal electrode 22 of the chip capacitor 20*d*.

The connecting portion 54 is disposed along and over the opening edge surface 66 of the case 60*a* and the opening edge surface 66 of the case 60*b*. The chip capacitor 20*a* accommodated in the case 60*a* and the chip capacitor 20*c* accommodated in the case 60*b* are electrically connected via the first connection metal terminal 50*a*, and the chip capacitor 20*b* accommodated in the case 60*a* and the chip capacitor 20*d* accommodated in the case 60*b* are electrically connected via the second connection metal terminal 50*b*.

Also, the second terminal electrode 22 of the chip capacitor 20*a* accommodated in the case 60*a* and the second terminal electrode 22 of the chip capacitor 20*b* accommodated in the case 60*a* are electrically connected via the common metal terminal 40. Further, the first terminal electrode 21 of the chip capacitor 20*c* accommodated in the case 60*b* is electrically connected to the first individual metal terminal 30*a*, and the first terminal electrode 21 of the chip capacitor 20*d* accommodated in the case 60*b* is electrically connected to the second individual metal terminal 30*b*. Consequently, in the present embodiment, the four chip capacitors 20*a* to 20*d* can be connected in series inside the cases 60*a* and 60*b*.

The present embodiment can also achieve the same effects as those of the first embodiment. Additionally, in the present embodiment, a combined body of the cases 60*a* and 60*b* can be structured by connecting the cases 60*a* and 60*b* via the respective joint portions 68 of the cases 60*a* and 60*b*. This achieves an electronic device module including the chip capacitors 20*a* to 20*d* accommodated in the cases 60*a* and 60*b*.

Third Embodiment

Figure 11:
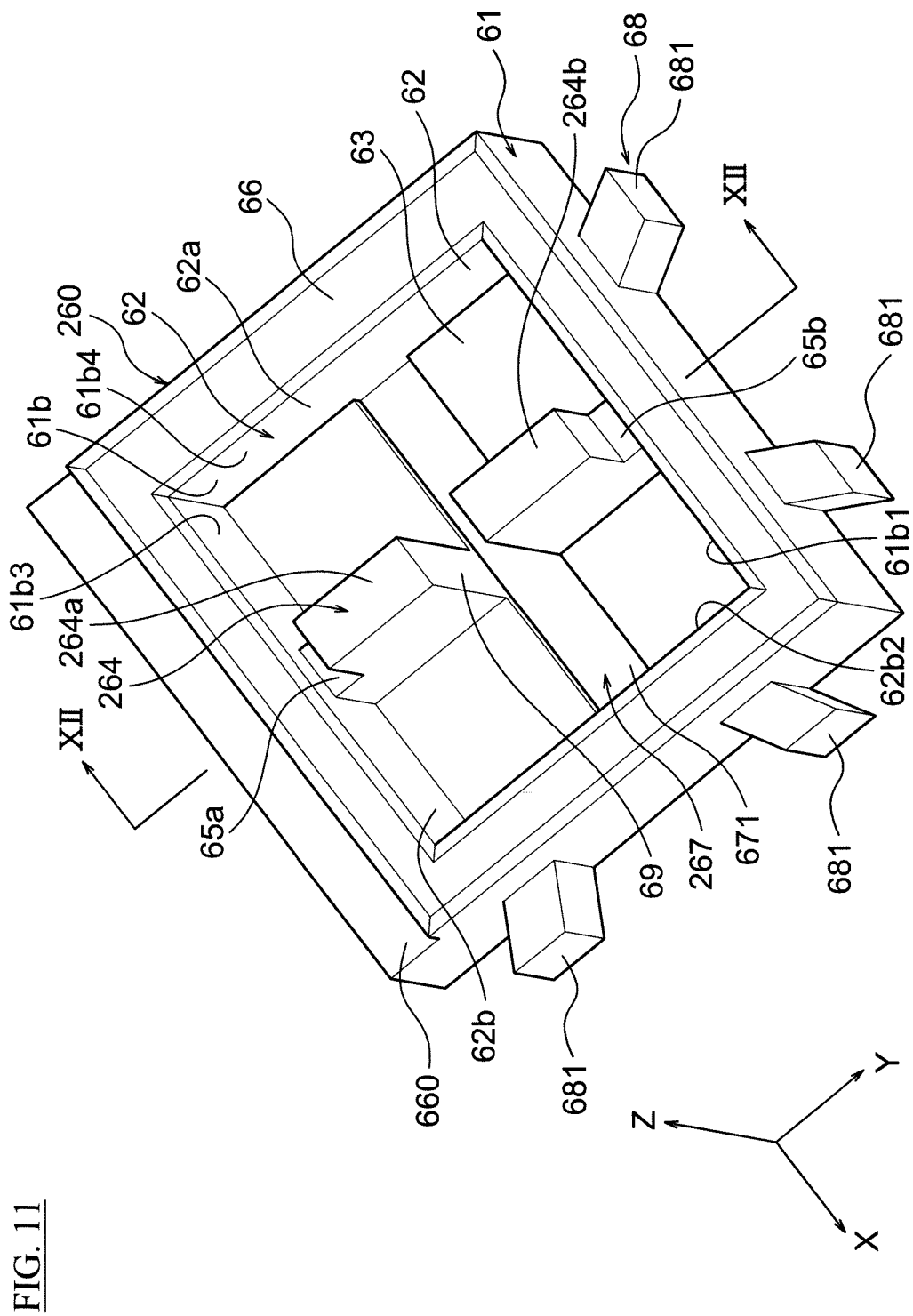
FIG. 11 is a perspective view of an electronic device according to a third embodiment of the present invention.
Figure 12:
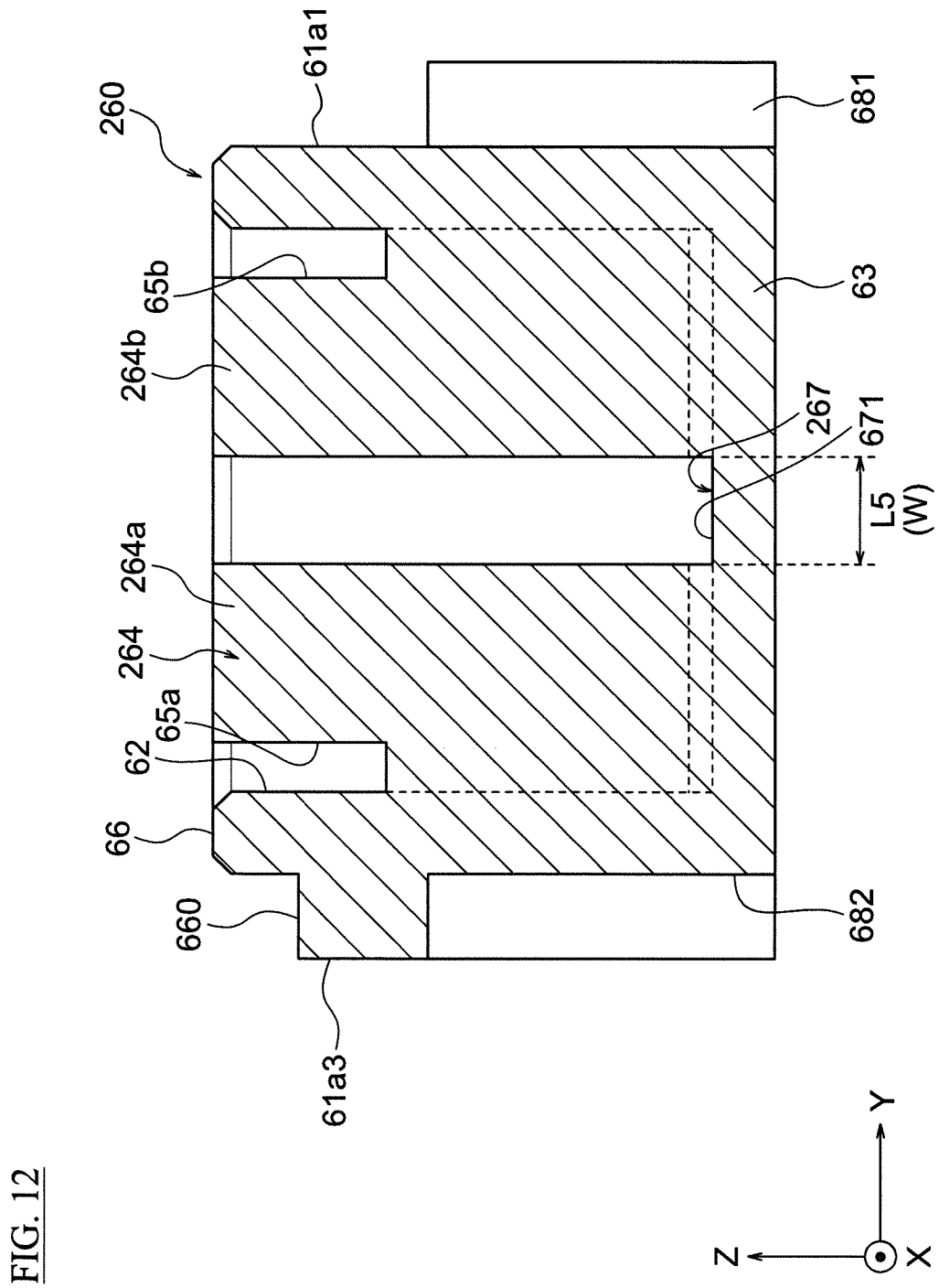
FIG. 12 is a cross-sectional view of the case shown in FIG. 11 along the XII-XII line.

An electronic device according to a third embodiment of the present invention shown in FIGS. 11 and 12 has the same structure as the electronic device 10 according to the first embodiment except for the following matters and exhibits the same effects. In the figures, the members common to those of the electronic device 10 according to the first embodiment are given the common reference numerals, and their description is partly omitted.

As shown in FIG. 11, the electronic device according to the present embodiment includes a case 260, which is different from the case 60 (see FIG. 4A) according to the first embodiment in that the case 260 includes a protrusion 264. The protrusion 264 includes a first protrusion 264*a* and a second protrusion 264*b*.

A communication groove 65*a* extending along a third surface 61*b*3 of an inner wall surface 61*b* of an accommodation recess 62 is formed where the first protrusion 264*a* and the inner wall surface 61*b* (the third surface 61*b*3) are connected. The first protrusion 264*a* and the third surface 61*b*3 of the inner wall surface 61*b* are facing each other in the Y-axis direction with the communication groove 65*a* provided in between.

A communication groove 65*b* extending along a first surface 61*b*1 of the inner wall surface 61*b* of the accommodation recess 62 is formed where the second protrusion 264*b* and the inner wall surface 61*b* (the first surface 61*b*1) are connected. The second protrusion 264*b* and the first surface 61*b*1 of the inner wall surface 61*b* are facing each other in the Y-axis direction with the communication groove 65*b* provided in between.

The communication grooves 65*a* and 65*b* are each recessed toward a bottom surface of the accommodation recess 62 along the Z-axis direction. Via the communication grooves 65*a* and 65*b*, a first accommodation space 62*a* and a second accommodation space 62*b* communicate along the X-axis direction. Although a detailed figure is omitted, the common metal terminal 40 shown in FIG. 7 is attached to the opening edge surface 66 of the case 260 both in the positive and negative directions of the Y-axis, and the connection portion 48 of the common metal terminal 40 can be disposed inside (accommodated in) each of the communication grooves 65*a* and 65*b*.

The width of the communication grooves 65*a* and 65*b* along the Y-axis direction is equivalent to or greater than the plate thickness of the common metal terminal 40. This enables the connection portion 48 of the common metal terminal 40 to be smoothly inserted inside the respective communication grooves 65*a* and 65*b*.

The depth of the communication grooves 65*a* and 65*b* along the Z-axis direction is substantially the same as the width of the connection portion 48 of the common metal terminal 40 shown in FIG. 7 along the Z-axis direction, but may be deeper. The depth of the communication grooves 65*a* and 65*b* along the Z-axis direction being equivalent to or greater than the width of the connection portion 48 along the Z-axis direction can prevent unnecessary protrusion of the connection portion 48 from the opening of the accommodation recess 62 when the common metal terminal 40 is attached to the case 260 at the opening edge surface 66 in both the positive and negative directions of the Y-axis. The height from the bottom surface of the accommodation recess 62 to the bottom of the communication grooves 65*a* and 65*b* along the Z-axis direction is substantially the same as the height H1 of the first protrusion 64*a* and the second protrusion 64*b* along the Z-axis direction shown in FIG. 6.

On the bottom surface of the accommodation recess 62, a bottom surface groove 267 is formed. The bottom surface groove 267 includes only a first bottom surface groove 671 extending along the X-axis direction and does not include a second bottom surface groove 672 (see FIG. 4A) extending along the Y-axis direction. As shown in FIG. 12, the distance W between the first protrusion 264*a* and the second protrusion 264*b* (the length of the communication space 69 along the Y-axis direction) of the present embodiment is equivalent to the length L5 of the bottom surface groove 267 along the Y-axis direction. Note that L5<W may be satisfied. The bottom surface groove 267 may include a second bottom surface groove 672.

The present embodiment can also achieve the same effects as those of the first embodiment. Additionally, in the present embodiment, the chip capacitors 20*a* and 20*b* can be connected in parallel inside the case 260 by inserting the connection portion 48 (see FIG. 7) of the common metal terminal 40 into each of the communication grooves 65*a* and 65*b*, connecting the first terminal electrode 21 of the chip capacitor 20*a* accommodated in the first accommodation space 62*a* and the first terminal electrode 21 of the chip capacitor 20*b* accommodated in the second accommodation space 62*b* via one common metal terminal 40, and connecting the second terminal electrode 22 of the chip capacitor 20*a* accommodated in the first accommodation space 62*a* and the second terminal electrode 22 of the chip capacitor 20*b* accommodated in the second accommodation space 62*b* via the other common metal terminal 40.

The above-mentioned embodiments should not be construed to limit the present invention. The present invention can be modified variously within the scope of the present invention.

Figure 13:
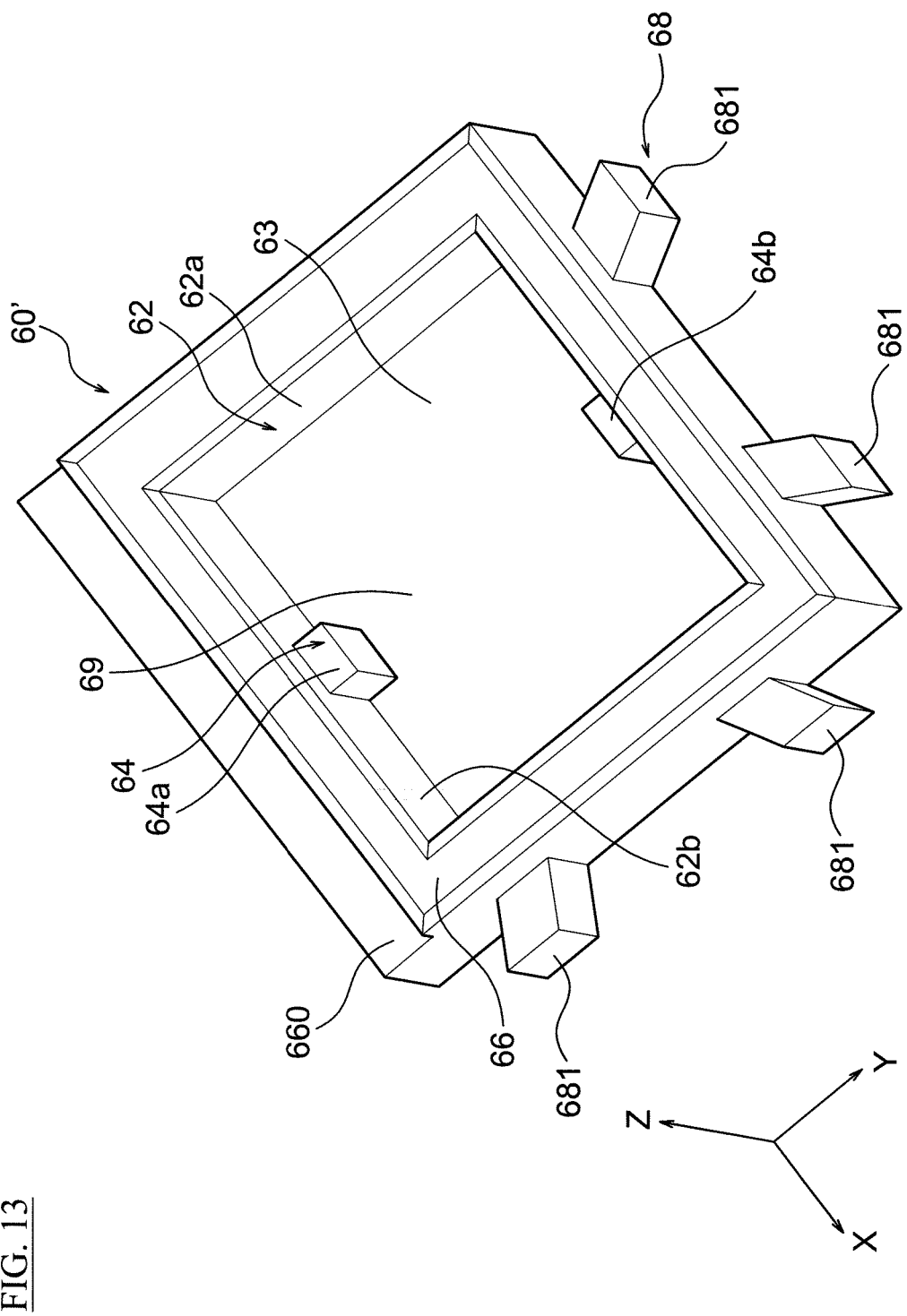
FIG. 13 is a perspective view of a modified example of the electronic device shown in FIG. 1.

In the first embodiment, the bottom surface groove 67 is formed on the bottom surface (the bottom wall 63) of the accommodation recess 62 as shown in FIG. 4A. However, the bottom surface groove 67 may be omitted from the bottom surface of the accommodation recess 62 as shown in FIG. 13. In this case, only the second bottom surface groove 672 may be omitted, or only the first bottom surface groove 671 may be omitted. The same applies to the second embodiment and the third embodiment.

The chip capacitors 20a and 20b are illustrated as examples of the chip components of the first embodiment as shown in FIG. 2. However, the chip components are not limited to chip capacitors and may be other chip components. The other chip components include, for example, inductors and resistors. The same applies to the second embodiment and the third embodiment.

In the first embodiment, FIG. 1 illustrates a state of the inside of the accommodation recess 62 of the case 60 accommodating the two chip capacitors 20a and 20b. However, the electronic device 10 is not necessarily used with the two chip capacitors 20a and 20b accommodated inside the accommodation recess 62. The electronic device 10 may be used with either the chip capacitor 20a or the chip capacitor 20b accommodated inside the accommodation recess 62. The same applies to the second embodiment and the third embodiment.

In the first embodiment, the first individual metal terminal 30a, the second individual metal terminal 30b, and the common metal terminal 40 are attached to the case 60 as the conductive terminals as shown in FIG. 2. However, the conductive terminals to be attached to the case 60 are not limited to these conductive terminals and may be changed as appropriate. For example, four first individual metal terminals 30a may be attached to the case 60 as the conductive terminals. In this case, the two chip capacitors 20a and 20b do not electrically connect with each other inside the case 60. However, when the electronic device 10 is mounted on an external circuit, the two chip capacitors 20a and 20b may be electrically connected in the external circuit, for example.

Instead, two common metal terminals 40 may be attached to the case 60 as the conductive terminals. In this case, the two chip capacitors 20 and 20b can be connected in parallel inside the case 60.

In the first embodiment, the step portion 660 and the joint portion 68 shown in FIG. 4A are not essential and may be omitted from the case 60. The same applies to the second embodiment and the third embodiment.

In the first embodiment, both of the first protrusion 64a and the second protrusion 64b are connected to the inner wall surface 61b of the accommodation recess 62 as shown in FIG. 4A. However, a gap (space) may be formed between either the first protrusion 64a or the second protrusion 64b and the inner wall surface 61b along the Y-axis direction. The same applies to the second embodiment and the third embodiment.

In the first embodiment, the first protrusion 64a and the second protrusion 64b are physically separated from one another along the Y-axis direction. However, the first protrusion 64a and the second protrusion 64b may be connected. For example, a connecting part that connects the first protrusion 64a and the second protrusion 64b in the Y-axis direction may be formed so that the connecting part extends in the Y-axis direction along the bottom surface of the accommodation recess 62. The same applies to the second embodiment and the third embodiment.

In the first embodiment, the first bottom surface groove 671 extends along the X-axis direction as shown in FIG. 4B.

However, the shape of the first bottom surface groove 671 is not limited to this shape. For example, a plurality of first bottom surface grooves 671 may extend from the central portion of the bottom surface of the accommodation recess 62 toward outer edges of the bottom surface of the accommodation recess 62 in a radial pattern. The same applies to the second embodiment and the third embodiment.

In the first embodiment, the second bottom surface groove 672 extends linearly along the Y-axis direction as shown in FIG. 4B. However, the shape of the second bottom surface groove 672 is not limited to this shape. For example, the second bottom surface groove 672 may extend in a curve (e.g., in an arc or in a ring shape). The same applies to the second embodiment.

In the third embodiment, the communication grooves 65 are formed where the first protrusion 264a and the inner wall surface 61b of the accommodation recess 62 are connected and where the second protrusion 264b and the inner wall surface 61b of the accommodation recess 62 are connected, as shown in FIG. 11. However, either of the communication grooves 65 may be omitted.

In the first embodiment, the first bottom surface groove 671 extends along the X-axis direction toward the edges of the bottom surface of the accommodation recess 62 in the X-axis direction as shown in FIG. 4A. However, the first bottom surface groove 671 may end at a location on an inner side of the X-axis direction compared to the edges. Also, the second bottom surface groove 672 extends along the Y-axis direction toward the edges of the bottom surface of the accommodation recess 62 in the Y-axis direction. However, the second bottom surface groove 672 may end at a location on an inner side of the Y-axis direction compared to the edges. The same applies to the second embodiment and the third embodiment.

In the second embodiment, the two cases 60a and 60b are connected as shown in FIG. 8. However, the number of cases 60 to be connected is not limited to two and may be three or more. Additionally, the cases 60 may be connected along the Y-axis direction or along the X-axis direction.

DESCRIPTION OF THE REFERENCE NUMERALS 10, 110 . . . electronic device
20a, 20b, 20c, 20d . . . chip capacitor
21 . . . first terminal electrode
22 . . . second terminal electrode
23 . . . first end surface
24 . . . second end surface
25 . . . side surface
26 . . . internal electrode layer
27 . . . dielectric layer
30a, 30b . . . individual metal terminal
32 . . . inner electrode portion
34 . . . opening edge electrode portion
36 . . . side electrode portion
40 . . . common metal terminal
42 . . . inner electrode portion
44 . . . opening edge electrode portion
46 . . . side electrode portion
48 . . . connection portion
50a, 50b . . . connection metal terminal
52 . . . inner electrode portion
520 . . . curved portion
54 . . . connecting portion
60, 60a, 60b, 260 . . . case
61 . . . outer wall 61a . . . outer surface
61b . . . inner wall surface
61 . . . accommodation recess
62a . . . first accommodation space
62b . . . second accommodation space
63 . . . bottom wall
63a to 63f . . . first step surface to sixth step surface
64, 264 . . . protrusion
64a, 264a . . . first protrusion
64b, 264b . . . second protrusion
65a, 65b . . . communication groove
66 . . . opening edge surface
660 . . . step portion
67, 267 . . . bottom surface groove
671 . . . first bottom surface groove
672a, 672b . . . second bottom surface groove
68 . . . joint portion
681 . . . joint protrusion
681a, 681b . . . outer surface
682 . . . joint recess
682a, 682b . . . inner surface
69 . . . communication space
70 . . . resin

What is claimed is:

1. An electronic device comprising:
a chip component;
an accommodation recess accommodating the chip component; and
a case including a protrusion partitioning the accommodation recess into a first accommodation space and a second accommodation space along a first axis direction; wherein
the protrusion includes a first protrusion and a second protrusion disposed away from the first protrusion along a second axis direction orthogonal to the first axis direction; and
the first protrusion and the second protrusion are disposed with a communication space provided between the first protrusion and the second protrusion, so that the first accommodation space and the second accommodation space communicate.

2. The electronic device according to claim 1, wherein the accommodation recess is filled with a resin, and the communication space is filled with the resin.

3. The electronic device according to claim 1, wherein a length of the communication space along the second axis direction is equivalent to or greater than a thickness of the protrusion along the first axis direction.

4. The electronic device according to claim 1, wherein the first protrusion and the second protrusion are separated from each other along the second axis direction and stand on a bottom surface of the accommodation recess.

5. The electronic device according to claim 2, wherein the first protrusion and the second protrusion are separated from each other along the second axis direction and stand on a bottom surface of the accommodation recess.

6. The electronic device according to claim 1, wherein
at least one of the first protrusion or the second protrusion is connected to an inner wall surface of the accommodation recess,
a communication groove is formed where the at least one of the first protrusion or the second protrusion is connected to the inner wall surface of the accommodation recess, and
the communication groove is recessed toward a bottom surface of the accommodation recess and enables the first accommodation space and the second accommodation space to communicate.

7. The electronic device according to claim 1, wherein
a bottom surface groove is formed on a bottom surface of the accommodation recess, and
the bottom surface groove extends between the first protrusion and the second protrusion toward an outer edge of the bottom surface of the accommodation recess.

8. The electronic device according to claim 2, wherein
a bottom surface groove is formed on a bottom surface of the accommodation recess, and
the bottom surface groove extends between the first protrusion and the second protrusion toward an outer edge of the bottom surface of the accommodation recess.

9. The electronic device according to claim 7, wherein the bottom surface groove includes
a first bottom surface groove extending along the first axis direction between the first protrusion and the second protrusion and
a second bottom surface groove extending along the second axis direction so that the second bottom surface groove is connected to the first bottom surface groove.

10. The electronic device according to claim 1, wherein a pair of joint protrusions protruding outwards from a side surface of the case and a joint recess recessed inwards from another side surface of the case are formed on the side surfaces of the case.

* * * * *